US009002189B2

(12) United States Patent
Weigand et al.

(10) Patent No.: US 9,002,189 B2
(45) Date of Patent: Apr. 7, 2015

(54) LONG-RANGE OPTICAL DEVICE HAVING IMAGE STABILIZATION AND IMPROVED PIVOT DETECTION

(71) Applicant: Carl Zeiss Sports Optics GmbH, Wetzlar (DE)

(72) Inventors: Holger Weigand, Koeln-Deutz (DE); Philipp Jester, Ulm (DE); Dirk Jahn, Erfurt (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 1 day.

(21) Appl. No.: 13/739,231

(22) Filed: Jan. 11, 2013

(65) Prior Publication Data
US 2013/0194443 A1  Aug. 1, 2013

Related U.S. Application Data

(60) Provisional application No. 61/586,344, filed on Jan. 13, 2012.

(30) Foreign Application Priority Data

Jan. 13, 2012 (DE) .................. 10 2012 000 862

(51) Int. Cl.
*G03B 17/00* (2006.01)
*H04N 5/232* (2006.01)
*G02B 27/64* (2006.01)

(52) U.S. Cl.
CPC .......... *H04N 5/23248* (2013.01); *G02B 27/646* (2013.01)

(58) Field of Classification Search
USPC ........ 396/55; 348/143, 208.16; 359/375, 555, 359/557, 554, 855
See application file for complete search history.

(56) References Cited

U.S. PATENT DOCUMENTS

| 5,122,908 | A | | 6/1992 | Sporer ......................... 359/557 |
|---|---|---|---|---|
| 5,444,509 | A | * | 8/1995 | Ohishi .......................... 396/439 |
| 5,754,339 | A | * | 5/1998 | Kanai et al. ................... 359/557 |
| 6,043,934 | A | * | 3/2000 | Hirunuma et al. ............. 359/557 |
| 6,091,448 | A | * | 7/2000 | Washisu et al. ........... 348/208.16 |
| 6,128,442 | A | | 10/2000 | Enomoto ........................ 396/53 |
| 6,208,377 | B1 | | 3/2001 | Morofuji et al. ........... 348/208.8 |

(Continued)

FOREIGN PATENT DOCUMENTS

| DE | 693 19 677 T2 | 2/1995 |
|---|---|---|
| DE | 199 37 775 A1 | 2/2000 |

(Continued)

*Primary Examiner* — Clayton E Laballe
*Assistant Examiner* — Warren K Fenwick
(74) *Attorney, Agent, or Firm* — Muirhead and Saturnelli, LLC

(57) ABSTRACT

A long-range optical device has at least one tube in which an optical system is positioned and has at least one image stabilization unit which moves at least one optical assembly of the optical system relative to the at least one tube. The device has at least one signal processing unit which actuates the at least one image stabilization unit in one mode of a plurality of modes where a respective movement situation of the long-range optical device is assigned to each mode. The device also has a mode detection unit that determines the mode and ascertains at least one comparative value from a respective location derivative value of a trajectory formed from a first movement and a second movement of the long-range optical device and compares the at least one comparative value to a respective limiting value.

15 Claims, 14 Drawing Sheets

(56) References Cited

U.S. PATENT DOCUMENTS

| | | | |
|---|---|---|---|
| 6,384,976 B1 | 5/2002 | Ishijima et al. | 359/557 |
| 6,388,705 B1* | 5/2002 | Kawahara et al. | 348/208.99 |
| 6,741,392 B2* | 5/2004 | Fu | 359/557 |
| 7,088,512 B2* | 8/2006 | Haga | 359/554 |
| 7,330,313 B2* | 2/2008 | Baumann et al. | 359/557 |
| 7,912,283 B1* | 3/2011 | Repperger et al. | 382/168 |
| 2001/0055155 A1* | 12/2001 | Kanai et al. | 359/557 |
| 2002/0089749 A1* | 7/2002 | Hirunuma et al. | 359/557 |
| 2003/0231393 A1* | 12/2003 | Yamamoto et al. | 359/557 |
| 2009/0040612 A1* | 2/2009 | Ota | 359/554 |

FOREIGN PATENT DOCUMENTS

| | | |
|---|---|---|
| EP | 0 587 432 B1 | 3/1994 |
| EP | 0 834 761 A1 | 4/1998 |
| EP | 1 708 019 A2 | 10/2006 |
| EP | 1 980 904 A2 | 10/2008 |
| JP | 2001-100106 A | 4/2001 |

* cited by examiner

LONG-RANGE OPTICAL DEVICE HAVING IMAGE STABILIZATION AND IMPROVED PIVOT DETECTION

CROSS-REFERENCE TO RELATED APPLICATIONS

This application claims the priority of German patent application No. DE 10 2012 000 862.7, filed Jan. 13, 2012, and of U.S. provisional patent application No. 61/586,344, filed on Jan. 13, 2012.

BACKGROUND OF THE INVENTION

The present invention relates to a long-range optical device having at least one tube, in which an optical system is positioned, having at least one image stabilization unit, which is designed for the purpose of moving at least one optical assembly of the optical system relative to the at least one tube, having at least one signal processing unit, which is designed such that it actuates or controls at least one image stabilization unit in one mode of a plurality of modes, wherein a respective movement situation of the long-range optical device is assigned to each mode, and having a mode detection unit, which is designed such that it determines the mode from the plurality of modes.

Furthermore, the present invention relates to a method for determining a mode for an actuation of an image stabilization unit in a long-range optical device, wherein the image stabilization unit is actuated in one mode of a plurality of modes, wherein a respective movement situation of the long-range optical device is assigned to each mode.

The long-range optical devices in the scope of the present invention can be in particular monocular or binocular telescopes. Therefore, when reference is made hereafter to a monocular or binocular telescope, however, this is not to be understood as restrictive in any way with respect to the type of the long-range optical device. Fundamentally, these can also be long-range optical devices other than modular or binocular telescopes, for example a camera.

Long-range optical devices frequently have image stabilization, to compensate for shaky rotational movements of the long-range optical device. The shaky movements can originate from a user of the long-range optical device, who holds the long-range optical device in front of his eyes, but can also be caused by a specific supporting surface, for example if the user is located on a ship. The shaky movements typically occur primarily around a vertical axis and a transverse axis of the long-range optical device. Under these shaky rotational movements, a visible image resolution suffers and small image details are made non-recognizable. In addition, the blurred image is frequently perceived to be annoying by a user.

Therefore, various proposals for types of the image stabilization have been made in the prior art. For example, solely mechanical image stabilizations are known. These can act solely passively, for example like an eddy current brake. However, active systems are also known, which act on an image stabilization unit by means of actuators.

In particular, the actuators of an active mechanical image stabilization system can be embedded in a control loop, wherein the actuators are actuated or controlled by a central signal processing unit of the long-range optical device. The type of the optical elements which are acted upon by means of the image stabilization unit in order to cause the image stabilization can also differ. Various possible solutions for this purpose were proposed in the prior art, for example the reversal system, which can be a lens reversal system or a prism reversal system, for rotation relative to a tube or housing element of the long-range optical device around one or more axes or moving the objective or a part of the objective perpendicularly to an optical axis of the long-range optical device. Solely software-based implementations of image stabilization are also possible, in particular in cooperation with digital image recording. Except in solely passively operating mechanical systems, a use of the present invention is fundamentally conceivable with all other types of image stabilization.

In the case of image stabilization, it is desirable for a compensation of the movements of the long-range optical device because of external influences to only be performed when the movements are unintentional. These unintentional movements are designated in the scope of this application as shaky movements or shaky rotational movements. However, intentional movements are to be differentiated therefrom, for example when a user pivots the long-range optical device to observe a different object, or when the user follows a moving object during an observation. Of course, no compensation of the movement is to occur during these intentional movements. Otherwise, behaviour of the long-range optical device which is irritating for the user would initially occur, because the image would remain stationary although he pivots the long-range optical device. Furthermore, an image stabilization unit would reach a maximum possible compensation or deflection from a certain movement extent and stop there.

Therefore, a unit which is referred to as a mode detection unit hereafter is typically provided in the long-range optical devices, which can be implemented as hardware and also as software. The mode detection unit can be provided separately, but also as part of the central signal processing unit, for example, and is used for the purpose of differentiating between undesired shaky rotational movements and intentional pivot or tilt movements. Therefore, it differentiates between various movement situations, to each of which a corresponding mode of the image stabilization is assigned, and which takes into consideration the character of the movement situation, i.e. whether it is unintentional or intentional. Various proposals have already been made for the differentiation between various movement situations or the accompanying establishment of a mode of the image stabilization, respectively.

Thus, for example, the publication DE 199 37 775 A1, shows a level detector, which detects a current angular velocity signal and on the basis of a threshold value comparison assumes an influence on the type of the actuation of an image stabilization unit, for example in that a high-pass filter and an integrator unit of the angular velocity signal are bypassed.

The publication U.S. Pat. No. 6,384,976 B1 also shows the determination of the mode of the image stabilization on the basis of a comparison of an angular velocity signal to a fixed threshold value. If a threshold value is exceeded, a changeover into another mode occurs. If the value falls below the same threshold value or another threshold value again, it switches back into the original mode.

The publication EP 1 980 904 A2 also shows a differentiation between various modes of image stabilization on the basis of a comparison to a specific threshold value.

The publication EP 1 708 019 A1 proposes carrying out a comparison to a fixed threshold value, in this case on the basis of a correction value which is calculated by a central data processing unit for the actuation of the image stabilization unit.

The publication EP 0 587 432 B1 proposes detecting a pivot of the long-range optical device both from the curve of an angular velocity and also from the curve of an angle resulting therefrom. A pivot always exists if a constant angular velocity and a monotonously increasing angle are provided. If a pivot exists, the limiting frequency of a high-pass filter is increased, so that a low-frequency pivot movement is filtered.

Finally, another isolated proposal in the publication U.S. Pat. No. 5,444,509 A is concerned with using a measured angular velocity and its first derivative and its second derivative to actuate an image stabilization unit.

To differentiate between a plurality of modes or to determine a specific mode for the image stabilization, respectively, the prior art thus proposes performing a decision about the existence of a specific image stabilization mode or a pivot procedure for each coordinate direction separately from a comparison of a corresponding angular velocity to a fixed threshold value or from an observation of a curve or profile of the angular velocity. However, a comparison solely of an angular velocity to a fixed value unchangeably influences the behaviour of the long-range optical device. If such a threshold value is configured excessively low or excessively high, for example an intentional movement of the long-range optical device is recognized, although the movement is actually not intentional. Furthermore, it can occur that a very slow intentional pivot or tilt movement is not recognized as an intentional movement and is therefore compensated for by the image stabilization. This is true in particular in the event of a separate observation of the various movement directions. A pivot detection on the basis of an observation of the curve of angular velocity and corresponding angle typically has the result that a beginning of a pivot procedure or an intentional movement is detected excessively late and an end of the pivot procedure or the intentional movement is detected excessively early, so that sometimes an incorrect image stabilization mode is applied.

BRIEF SUMMARY OF THE INVENTION

It is therefore an object of the present invention to specify a long-range optical device or a method, respectively, which provides improved, in particular more rapid and precise, determination of a mode of the image stabilization.

According to a first aspect of the invention, it is therefore provided a long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value.

According to a second aspect of the invention, it is provided a method for determining a mode for an actuation of an image stabilization unit in a long-range optical device wherein the image stabilization unit is actuated in one mode of a plurality of modes, wherein a respective movement situation of the long-range optical device is assigned to each mode, wherein the mode is determined in that at least one comparative value is ascertained from a location derivative value of a trajectory formed from a first movement and a second movement of the long-range optical device and the at least one comparative value is compared to a respective limiting value.

In particular, the first movement can be a pitch movement around a transverse axis of the long-range optical device and the second movement can be a yaw movement around a vertical axis of the long-range optical device. The trajectory is then a so-called angle trajectory. The two angular velocities, which are orthogonal to one another, around the vertical axis and the transverse axis of the long-range optical device are measured. Through integration with respect to time, two angle deflections which are orthogonal to one another are calculated therefrom. The curve which is obtained when the angle deflections x and y are plotted in relation to one another is designated as the angle trajectory. A corresponding procedure can also be used with other movements, for example with movements perpendicular to an optical axis of the long-range optical device. Velocities in corresponding spatial directions can also be measured, integrated, and plotted against one another here to obtain a corresponding trajectory. For the detection of a specific mode, spatial derivatives and optionally second spatial derivatives are then initially calculated. Through a comparison of these derivatives to limiting values either at discrete points in time or over specific periods of time, rapid and precise detection of a beginning and an end of a specific movement situation is obtained. In particular, in addition to a use of the actual values of the derivatives, a norm of the location derivative can also be observed, for example the absolute value norm. In the case of an observation over a specific time interval, for example, an arc length of a location derivative value which is determined by means of a curve integral can also be compared to a limiting value, or an arbitrary norm can be observed over the integral of the location derivative values in a specific time interval. These different possibilities will be discussed in greater detail hereafter.

The term "norm" is to be understood in its mathematical sense. In particular, it also comprises the simple case of an absolute value norm or the case of an arbitrary p-norm. The term "location derivative" is to be understood in the mathematical meaning of a spatial derivative $d/dx$ or $d/dy$, wherein x or x(t) and y or y(t) are the "movements", respectively.

The "first movement" and the "second movement" are thus positions of the long-range optical device which change over a time curve. A position can be, for example, an angle around the transverse axis of the long-range optical device, the so-called pitch angle, or an angle around the vertical axis of the long-range optical device, the so-called yaw angle. The first movement can then be, for example, the time curve of the pitch angle. The second movement can then be, for example, the time curve of the yaw angle. Value pairs of pitch angle and yaw angle result therefrom at a respective specific point in time, which can be plotted one over another to form an angle trajectory.

The term "trajectory" can in general relate to arbitrary positions of the long-range optical device plotted against one another, however. If angles are plotted one over another, this is accordingly an angle trajectory; however, deflections perpendicular to an optical axis of the long-range optical device can also be plotted against one another, for example. A "movement" can therefore be understood as both the time curve of a specific angle deflection around one of the coordinate axes, and also a transverse deflection in the direction of one of the coordinate axes.

A "limiting value" is a value which is compared to the "comparative value". The limiting value is fixed once; in one refinement it can also be provided that the limiting value is designed as a parameter. The "comparative value" is the value which is compared to the "limiting value". The "comparative value" is formed from the "location derivative value". The "location derivative value" can be the actual value of a first location derivative, or also a second location derivative, with respect to a specific direction of a coordinate system. The "location derivative value" can also be the resulting value of a function, however, which was formed based on one or more location derivatives at specific points in time.

Overall, it has been shown that the observation of spatial derivatives or location derivatives of a trajectory or angle trajectory of the long-range optical device allows significantly more rapid and precise analysis of a movement situation of the long-range optical device, in particular more rapid and precise differentiation between intended movements, i.e. pivot movements of a user of the long-range optical device, and unintended movements, i.e. shaky movements or shaky rotational movements of the long-range optical device induced by a user or a supporting surface, for example a ship.

In particular, it can be provided that the plurality of modes has precisely two modes. A movement situation which corresponds to "intended movements" can be assigned to the first mode. A movement situation which corresponds to "unintended movements" can be assigned to the second mode. Since, in the case of a long-range optical device, primarily the rotational movements around a vertical axis and rotational movements around a transverse axis or lateral axis of the long-range optical device must be compensated for image stabilization, the first movement can in particular be a rotational movement around a transverse axis or lateral axis of the long-range optical device and the second movement can be a rotational movement around a vertical axis of the long-range optical device. The trajectory is then an angle trajectory in which angle deflections around the transverse axis and around the vertical axis are plotted against one another.

According to a third aspect of the invention, a computer program having program code means is provided, which is designed for the purpose of executing all steps of a method according to the second aspect of the invention, or one of its refinements, when the computer program is executed on a computer. There may be provided a computer program having program code means, which is designed for the purpose of executing all steps of a method for determining a mode for an actuation of an image stabilization unit in a long-range optical device wherein the image stabilization unit is actuation in one mode of a plurality of modes, wherein a respective movement situation of the long-range optical device is assigned to each mode, wherein the mode is determined in that at least one comparative value is ascertained from a location derivative value of a trajectory formed from a first movement and a second movement of the long-range optical device and the at least one comparative value is compared to a respective limiting value, when the computer program is executed on a computer or a corresponding data processing unit or a signal processing unit of the long-range optical device.

According to a fourth aspect of the invention, a computer program product having program code means is provided, which are stored on a computer-readable data carrier in order to carry out a method according to the second aspect of the invention, or one of its refinements, when the computer program is executed on a computer or a corresponding data processing unit. There may be provided a computer program product having program code means, which are stored on a computer-readable data carrier in order to carry out a method for determining a mode for an actuation of an image stabilization unit in a long-range optical device wherein the image stabilization unit is actuation in one mode of a plurality of modes, wherein a respective movement situation of the long-range optical device is assigned to each mode, wherein the mode is determined in that at least one comparative value is ascertained from a location derivative value of a trajectory formed from a first movement and a second movement of the long-range optical device and the at least one comparative value is compared to a respective limiting value, when the computer program is executed on a computer or a corresponding data processing unit or a signal processing unit of the long-range optical device.

The computer program according to the third aspect of the invention and the computer program product according to the fourth aspect of the invention therefore represent software-implemented possible solutions for a long-range optical device; for example, the data processing unit can be the signal processing unit of the long-range optical device.

According to a fifth aspect of the invention, a method for determining a mode for an actuation of an image stabilization unit in a long-range optical device is provided, wherein the image stabilization unit is actuated in one mode of a plurality of modes, wherein a respective movement situation of the long-range optical device is assigned to each mode, wherein a position signal, in particular an angle signal, for actuating the at least one image stabilization unit is generated by an integrator unit of a signal processing unit and an amplitude offset of the position signal which is induced by a movement procedure, in particular a pivot procedure, is eliminated and the position signal is limited to a maximum amplitude in that a subtraction value is ascertained, in that the position signal is divided by double the maximum amplitude and then rounded to a closest whole number and the closest whole number is then multiplied by double the maximum amplitude and then the subtraction value is subtracted from the position signal.

According to a sixth aspect of the invention, a computer program having program code means is provided, which is designed for the purpose of executing all steps of a method for determining a mode for an actuation of an image stabilization unit in a long-range optical device wherein the image stabilization unit is actuation in one mode of a plurality of modes, wherein a respective movement situation of the long-range optical device is assigned to each mode, wherein a position signal in particular an angle signal, for actuating the at least one image stabilization unit is generated by an integrator unit of the signal processing unit and an amplitude offset of the position signal which is induced by a movement procedure, in particular a pivot procedure, is eliminated and the position signal is limited to a maximum amplitude in that a subtraction value is ascertained, in that the position signal is divided by double the maximum amplitude and then rounded to a closest whole number and the closest whole number is then multiplied by double the maximum amplitude and then the subtraction value is subtracted from the position signal, when the computer program is executed on a computer or a corresponding data processing unit or the signal processing unit of the long-range optical device.

According to a seventh aspect of the invention, a computer program product having program code means is provided, which are stored on a computer-readable data carrier in order to carry out a method for determining a mode for an actuation of an image stabilization unit in a long-range optical device wherein the image stabilization unit is actuation in one mode of a plurality of modes, wherein a respective movement situation of the long-range optical device is assigned to each mode, wherein a position signal in particular an angle signal, for actuating the at least one image stabilization unit is generated by an integrator unit of the signal processing unit and an amplitude offset of the position signal which is induced by a movement procedure, in particular a pivot procedure, is eliminated and the position signal is limited to a maximum amplitude in that a subtraction value is ascertained, in that the position signal is divided by double the maximum amplitude and then rounded to a closest whole number and the closest whole number is then multiplied by double the maximum amplitude and then the subtraction value is subtracted from the position signal, when the computer program is executed on a computer or a corresponding data processing unit or a signal processing unit of the long-range optical device.

The computer program according to the sixth aspect of the invention and the computer program product according to the seventh aspect of the invention therefore represent software-implemented possible solutions for a long-range optical device; for example, the data processing unit can be the signal processing unit of the long-range optical device.

According to an eighth aspect of the invention, there s provided a long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the long-range optical device is further designed such that a position signal in particular an angle signal, for actuating the at least one image stabilization unit is generated by an integrator unit of the signal processing unit and an elimination of an amplitude offset of the position signal induced by a movement procedure, in particular a pivot procedure, and a limiting of the position signal to a maximum amplitude are performed, in that the signal processing unit ascertains a subtraction value in that it divides the position signal by double the maximum amplitude and then rounds it to a closest whole number and then multiplies the closest whole number by double the maximum amplitude and then subtracts the subtraction value from the position signal.

In one refinement of the long-range optical device according to the first aspect of the invention, it is provided that the comparative value is an arc length of the location derivative value over a first period of time.

Accordingly, it can also be provided in the method according to the second aspect of the invention that the comparative value is an arc length of the location derivative value over a first period of time.

If the location derivative value is formed from a first location derivative of the trajectory, the arc length can be formed, for example, by means of the formula $$\int_{t-\Delta t}^{t} \left\| \frac{d}{d\tau} \frac{dy}{dx}(\tau) \right\|_{euclid} d\tau$$

In this case, t is the point in time at which the arc length is determined, $\Delta t$ represents the length of the first period of time, $\tau$ is the integration variable, y and x are the time curves of the first movement or the second movement, respectively. Thus, for example, y can be an angle deflection around the vertical axis of the long-range optical device and x can be an angle deflection around the transverse axis or lateral axis of the long-range optical device. In the described formula, the location derivative is formed in the x direction; of course, the location derivative can also be formed in the y direction. The arc length of the location derivative value over a first period of time can represent, for example, a variable, using which the presence of a specific movement situation can be ascertained reliably on the basis of a comparison with a respective limiting value.

In a further refinement of the long-range optical device according to the first aspect of the invention, it can be provided that the comparative value is a norm of the respective location derivative value at a discrete point in time. In a further refinement of the long-range optical device according to the first aspect of the invention, it can be provided that the comparative value is an integral of a norm of the respective location derivative value over a second period of time.

Accordingly, it can also be provided in the method according to the second aspect of the invention that the comparative value is a norm of the respective location derivative value at a discrete point in time. Accordingly, it can also be provided in the method according to the second aspect of the invention that the comparative value is an integral of a norm of the respective location derivative value over a second period of time.

The norm can be the absolute value norm in the simplest case, in particular if the norm is determined at a discrete point in time. If the comparative value is an integral of a norm of the respective location derivative value over a second period of time, in particular a p-norm of the signal in the second period of time can be ascertained.

The determination of the comparative value on the basis of a norm at a discrete point in time is mathematically relatively simple and allows a simple comparison to a respective limiting value. However, in particular in the case of shaky movements, many zero crossings of the comparative value can occur, which can result in errors because of the zero values, which have to be handled frequently. In return, the comparison at a discrete point in time is very rapid. In contrast, the ascertainment of the comparative value on the basis of an integral of the norm over a second period of time offers a more robust value to be dealt with, since typically no zero crossings of the comparative value or zero values to be handled occur. However, the signal is to be integrated over the second period of time, so that a time delay by the second period of time occurs. Each of the two alternatives can be advantageous, depending on an application.

As an alternative, it can be provided both in the long-range optical device according to the first aspect and also the method according to the second aspect of the invention that the comparative value corresponds to the respective location derivative value, i.e., a norm of the location derivative value is not formed. It can also be provided both in the long-range optical device according to the first aspect and also the method according to the second aspect of the invention that the comparative value is the mean value of the location derivative values over a specific period of time.

In one refinement of the long-range optical device according to the first aspect of the invention, it is provided that the respective location derivative value is a location derivative of the trajectory at a discrete point in time. In a further refinement of the long-range optical device according to the first aspect of the invention, it is provided that the respective location derivative value is an integral of a location derivative of the trajectory over a third period of time.

Accordingly, it can also be provided in the method according to the second aspect of the invention that the respective location derivative value is a location derivative of the trajectory at a discrete point in time. Accordingly, it can also be provided in the method according to the second aspect of the invention that the respective location derivative value is an integral of a location derivative of the trajectory over a third period of time.

Accordingly, the location derivative value itself can also be a specific value of the location derivative at a discrete point in time, or the location derivative value can be formed from an integral of the location derivatives over a specific, third period of time. The advantages and disadvantages with respect to rapidity and robustness of the determination of the location derivative value result substantially similarly to the ascertainment of the comparative value. As an alternative, it can also be provided that the location derivative value corresponds to a mean value of the location derivatives over a specific period of time.

In a further refinement of the long-range optical device according to the first aspect of the invention, it is provided that the norm is the absolute value. In still a further refinement of the long-range optical device according to the first aspect of the invention, it is provided that the norm is a p-norm, in particular the Euclidean norm.

Furthermore, it can accordingly also be provided in the method according to the second aspect of the invention that the norm is the absolute value. Furthermore, it can accordingly also be provided in the method according to the second aspect of the invention that the norm is a p-norm, in particular the Euclidean norm.

Of course, further p-norms can also be provided, wherein p is a parameter which is an integer greater than zero. For example, a norm for p=16 can also be used. The use of the absolute value as a norm allows simple calculation of the norm and therefore low computing effort. In particular, it can be provided that the location derivative value is determined as an integral over a period of time $\Delta t$ and a p-norm of this location derivative value is ascertained as the comparative value. The comparative value then results as $$\gamma(t) = \left(\frac{1}{\Delta t} \cdot \int_{t-\Delta t}^{t} |\omega(s)|^p \, ds\right)^{\frac{1}{p}}$$

In this case, $\gamma$ is the comparative value, t is the point in time of the determination of the comparative value, $\Delta t$ is the second period of time over which the location derivative value is determined, $\omega$ is the location derivative at the point in time s, and s is the integration variable. The parameter p corresponds to the corresponding p-norm and is therefore an integer greater than zero. The higher p is selected, the more strongly are greater location derivative values weighted in the determination of the norm, so that an increase of the location derivative value results in a steeper increase of the comparative value. Therefore, more rapid recognition of a specific movement situation or an actuation in a mode assigned to this movement situation can occur.

In a further refinement of a long-range optical device according to the first aspect of the invention, it can be provided that the location derivative is a first derivative of the trajectory with respect to the first movement or with respect to the second movement. Alternatively or, in the case of a plurality of comparative values, cumulatively, it can furthermore be provided that the location derivative is a second derivative of the trajectory with respect to the first movement or the second movement.

Accordingly, it can also be provided in the method according to the second aspect of the invention that the location derivative is a first derivative of the trajectory with respect to the first movement or according to the second movement. Alternatively or, in the case of a plurality of comparative values, cumulatively, it can also be provided here that the location derivative is a second derivative of the trajectory with respect to the first movement or the second movement.

For example, if an angle trajectory is represented, a rotational movement around the vertical axis (y) is plotted over a rotational movement around the lateral axis or the transverse axis (x). The location derivative can then be formed as follows $$\frac{dx}{dy}, \frac{dy}{dx}, \frac{d^2y}{dx^2} \text{ and/or } \frac{d^2x}{dy^2}.$$

Fundamentally, an observation of the first derivative of the trajectory in one or both directions or according to one or both movements can be sufficient to precisely recognize a specific movement situation. Alternatively or cumulatively, however, an observation of the second derivatives can also be performed, which typically react more sensitively to movement changes and therefore have larger changes. This can allow still more rapid and still more precise recognition of specific movement situations, in particular of an intended pivot movement.

In a further refinement of the long-range optical device according to the first aspect of the invention, it can be provided that the location derivative is the smaller in absolute value of the first derivatives of the trajectory with respect to the first movement and the second movement. Alternatively or, in the case of a plurality of comparative values, cumulatively, it can be provided that the location derivative is the smaller in absolute value of the second derivatives of the trajectory with respect to the first movement and the second movement.

It can accordingly also be provided in the method according to the second aspect of the invention that the location derivative is the smaller in absolute value of the first derivatives of the trajectory with respect to the first movement and the second movement. Alternatively or, in the case of a plurality of comparative values, cumulatively, it can accordingly be provided that the location derivative is the smaller in absolute value of the second derivatives of the trajectory with respect to the first movement and the second movement.

In this manner, the spatial derivative or the location derivative in both directions is incorporated in the observation, which allows more reliable recognition of specific movement situations. For example, in the event of an intended movement of the long-range optical device, for example pivoting by the user, at least one of the two spatial derivatives will be small. Therefore, it is advantageous for determining an intended movement or a pivot to determine the minimum of the absolute values of the two location derivatives.

In a further refinement of the long-range optical device according to the first aspect of the invention, it can be provided that the first movement is a rotational movement and the second movement is a rotational movement and the trajectory is an angle trajectory.

Accordingly, it can also be provided in the method according to the second aspect of the invention that the first movement is a rotational movement and the second movement is a rotational movement and the trajectory is an angle trajectory.

As already stated above, in the case of long-range optical devices, in particular the movements around the vertical axis and the transverse axis or lateral axis of the long-range optical device are decisive for the image stabilization. In this regard, it is advantageous if the first movement and the second movement are respectively rotational movements, one around the vertical axis and one around the transverse axis of the long-range optical device. Accordingly, as a result the trajectory is an angle trajectory, which plots the angle deflection around the vertical axis and the angle deflection around the transverse axis against one another or one over the other.

In a further refinement of the long-range optical device according to the first aspect of the invention, it can be provided that the mode detection unit is designed such that it ascertains more than one comparative value and results of a respective comparison of each comparative value with a respective limiting value are linked by a logic gate.

Accordingly, it can also be provided in the method according to the second aspect of the invention that more than one comparative value is ascertained and results of a respective comparison of the comparative value to a respective limiting value are linked by a logic gate.

In this manner, it is possible to query conditions for various comparative values, which were determined from various location derivatives or were ascertained from various norms for specific location derivative values, for example. A corresponding linkage of the results by means of a logic gate, which can be a simple AND gate, for example, allows an analysis of the comparisons and the output of a result of the presence of a specific movement situation or a specific mode for actuating an image stabilization unit.

In a further refinement of the long-range optical device according to the first aspect of the invention, it is provided that the mode detection unit is designed such that a first comparative value of the plurality of comparative values corresponds to a second comparative value of the plurality of comparative values at an earlier point in time.

Accordingly, it can also be provided in the method according to the second aspect of the invention that a first comparative value of the plurality of comparative values corresponds to a second comparative value of the plurality of comparative values at an earlier point in time.

Therefore, this means that a comparative value is used with a certain time delay as a further comparative value. In particular, in this manner, even if the individual comparisons are only carried out on the basis of comparative values at discrete points in time, an observation of a certain period of time can be carried out because of the implemented delay.

In a further refinement of the long-range optical device according to the first aspect of the invention, it is provided that the long-range optical device is further designed such that a movement situation is assigned to a first mode which corresponds to a pivot procedure or an intended movement, respectively, and an angle signal or a position signal for actuating or controlling the at least one image stabilization unit is set to zero in the first mode.

Accordingly, it can also be provided in the method according to the second aspect of the invention that a movement situation is assigned to the first mode which corresponds to a pivot procedure, and an angle signal or a position signal for actuating or controlling the at least one image stabilization unit is set to zero in the first mode.

In a movement situation which corresponds to a pivot procedure or an intended movement, respectively, the entire movement of the long-range optical device is dominated by the low-frequency pivot movement. An image stabilization of shaky rotational movements is typically not necessary. Therefore, it is advantageous in this mode to set the angle signal for actuating the at least one image stabilization unit to zero. This causes the at least one image stabilization unit to return to its basic position, i.e. into a respective angle deflection of 0°, during the pivot procedure. In particular, this prevents at least one image stabilization unit from working against the intended movement or the pivot movement, respectively, and additionally possibly assuming a location in maximum deflection.

In a further refinement of the long-range optical device according to the first aspect of the invention, it can be provided that the long-range optical device is further designed such that a movement situation is assigned to a first mode which corresponds to a pivot procedure, and an angle signal or a position signal for actuating the at least one image stabilization unit is generated by an integrator unit, and an amplitude offset of the angle signal or the position signal which is induced by the pivot procedure is eliminated, in that the integrator unit is reset to zero upon leaving the first mode.

Accordingly, it can also be provided in the method according to the second aspect of the invention that a movement situation is assigned to a first mode which corresponds to a pivot procedure, and an angle signal or a position signal for actuating the at least one image stabilization unit is generated by an integrator unit, and an amplitude offset of the angle signal or the position signal which is induced by the pivot procedure is eliminated, in that the integrator unit is reset to zero upon leaving the first mode.

In this manner, it is ensured that the image stabilization unit, after leaving the first mode, performs shaky rotational movements proceeding from its basic position, i.e. the 0° deflected position. Otherwise, the image stabilization unit, proceeding from an already deflected position, would cause an image stabilization. In particular if the image stabilization unit is already located in a maximum deflection or close to a maximum deflection because of the pivot, an image stabilization in both possible rotational directions around a specific axis potentially can no longer be possible. It is therefore advantageous to reset the actuation signal to zero upon leaving the first mode, to which the pivot procedure is assigned.

In a further refinement of the long-range optical device according to the first aspect of the invention, it can be provided that the long-range optical device is further designed such that a position signal, in particular an angle signal, for actuating the at least one image stabilization unit is generated by an integrator unit of the signal processing unit, and an elimination of an amplitude offset of the position signal induced by a movement procedure, in particular a pivot procedure, and a limiting of the position signal to a maximum amplitude are performed, in that the signal processing unit ascertains a subtraction value, in that it divides the position signal by double the maximum amplitude and then rounds it to a closest whole number, and then multiplies the closest whole number by double the maximum amplitude, and then subtracts the subtraction value from the position signal. In particular, this refinement represents a concurrent, self-contained, and independent aspect of the invention, for example as defined as the eighth aspect of the invention.

Accordingly, it can also be provided in the method according to the second aspect of the invention that a position signal, in particular an angle signal, for actuating the at least one image stabilization unit is generated by an integrator unit of the signal processing unit, and an amplitude offset of the position signal which is induced by a movement procedure, in particular a pivot procedure, is eliminated and the position signal is limited to a maximum amplitude, in that a subtraction value is ascertained, in that the position signal is divided by double the maximum amplitude and then rounded to a closest whole number, and the closest whole number is then multiplied by double the maximum amplitude, and then the subtraction value is subtracted from the position signal. In particular, this refinement represents a concurrent, self-contained, and independent aspect of the invention, for example as defined as the fifth aspect of the invention.

Accordingly, a computer program having program code means, which is designed for the purpose of executing all steps of such a method when the computer program is executed on a computer, is also proposed. Furthermore, a computer program product having program code means is proposed, which are stored on a computer-readable data carrier in order to carry out such a method when the computer program is executed on a computer or a corresponding data processing unit.

In this manner, it is possible, using a direct signal feedthrough without any type of delay, to separate a low-frequency signal or a constant signal or a so-called offset, respectively, from a high-frequency signal. Only the high-frequency signal is output, which is additionally limited to the predefined maximum amplitude. In this manner, it is possible particularly simply and rapidly to filter out an amplitude offset which was induced by an intended pivot of the long-range optical device by the user. The proposed method acts like a high-pass filter, without having its time delay as a disadvantage, however. In particular, the proposed elimination of an amplitude offset can be switched on permanently independently of a mode; in this manner, it is not necessary to reset integrator units upon leaving a specific mode. A further advantage is that in this manner an offset of a sensor signal possibly present in an employed sensor element is filtered out.

In a further refinement of the long-range optical device according to the first aspect of the invention, it can be provided that the signal processing unit divides the position signal by a scaling factor before the elimination of the amplitude offset and the limiting to the maximum amplitude, and multiplies it by the scaling factor after the elimination of the amplitude offset and the limiting to the maximum amplitude.

Accordingly, it can also be provided in the method according to the second aspect of the invention that the position signal is divided by a scaling factor before the elimination of the amplitude offset and the limiting to the maximum amplitude and is multiplied by the scaling factor after the elimination of the amplitude offset and the limiting to the maximum amplitude.

The above-described rounding is performed to the closest whole number according to the typical method, i.e. from a value X.5, rounding up is performed, and rounding down is performed below this value. A provided effect of the interconnection is therefore achieved only for maximum amplitudes ≤1.0 of an amount of a respective unit of the signal (for example, degrees or rad). Correspondingly, a division by a scaling factor can be performed beforehand, to scale the signal in such a manner that the maximum amplitude is ≤1.0. For example, if a maximum amplitude of 2.0° is to be provided, the scaling factor would be 2, the signal would first be divided by 2, so that only half of the value, i.e. 1.0, is accordingly also to be used for the maximum amplitude. Subsequently, the signal is accordingly multiplied by the scaling factor again.

In a further refinement of the long-range optical device according to the first aspect of the invention, it can be provided that the long-range optical device is further designed such that a position signal, in particular an angle signal, for actuating the at least one image stabilization unit is generated by an integrator unit of the signal processing unit, and an elimination of an amplitude offset of the position signal which is induced by a movement procedure, in particular a pivot procedure, is performed in that the signal processing unit subtracts a mean value of the position signal, which is ascertained over a fourth period of time, from the position signal.

Accordingly, it can also be provided in the method according to the second aspect of the invention that a position signal, in particular an angle signal, for actuating the at least one image stabilization unit is generated by an integrator unit of the signal processing unit, and an elimination of an amplitude offset of the position signal which is induced by a movement procedure, in particular a pivot procedure, is performed in that the signal processing unit subtracts a mean value of the position signal, which is ascertained over a fourth period of time, from the position signal.

In this manner, it is possible in particular to filter out an amplitude offset because of a very slow pivot movement of the user. Such a pivot procedure can exist, for example, if a user follows a very slowly moving object. During such a movement situation, the typical shaky movements or shaky rotational movements exist, so that a movement situation in which an intended movement, i.e. an intended pivot, is present is typically not recognized. Nonetheless, of course, this low-frequency pivot movement which has the shaky rotational movement superimposed is not to be tracked by the image stabilization unit. Therefore, in this refinement it is presumed that the mean value of the position signals or the mean value of the angle signals over a specific fourth period of time corresponds to the position or angle deflection intended by the user. This is then more or less the "zero position", which is accordingly subtracted from the actually applied position signal or angle signal. In this manner, particularly effective handling of very slow intended movements is also possible, which would otherwise not be recognized by the mode detection unit as the corresponding movement situation for intended movements.

It is obvious that the abovementioned features and the features still to be explained hereafter are usable not only in the respective specified combination, but rather also in other combinations or alone, without leaving the scope of the present invention.

BRIEF DESCRIPTION OF THE SEVERAL VIEWS OF THE DRAWING

Exemplary embodiments of the invention are illustrated in the drawing and will be explained in greater detail in the following description. In the figures.

DETAILED DESCRIPTION OF THE INVENTION

Figure 1:
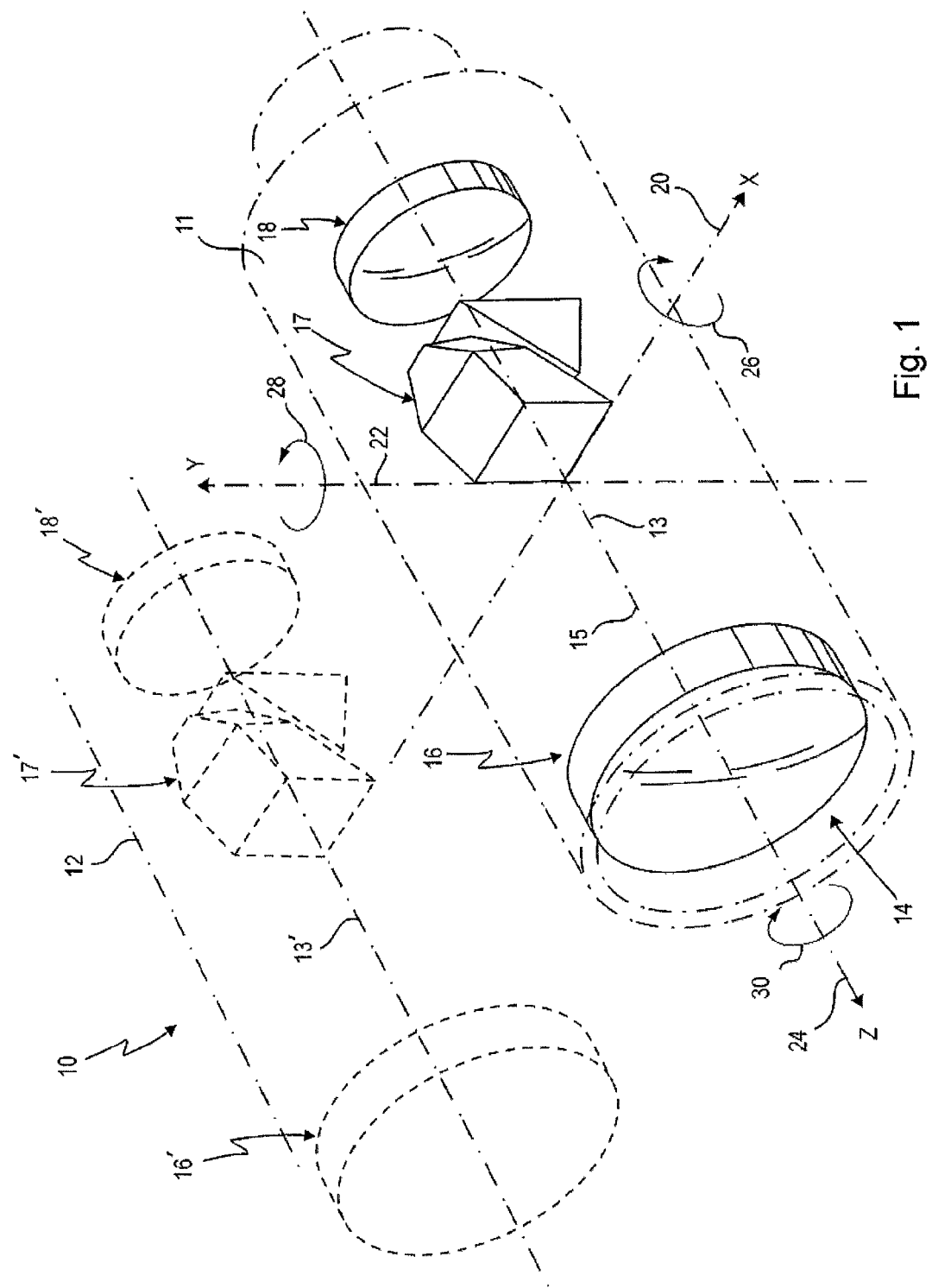
FIG. 1 shows a schematic illustration of a long-range optical device to explain the geometric relationships.

FIG. 1 shows a schematic illustration of a long-range optical device 10, primarily to explain the relationships in an image-stabilized long-range optical device.

The illustrated long-range optical device 10 has a first tube 11. In addition, the long-range optical device can have a second tube 12, for example a binocular telescope. The relationships are typically explained hereafter as an example on a long-range optical device 10 having only one first tube 11, without this being understood as restrictive.

The first tube 11 extends along its longitudinal axis 13. An optical system 14, which extends along an optical axis 15, is provided in the first tube 11. In the illustrated alignment, the optical axis 15 and the longitudinal axis 13 are coincident. In the scope of an image stabilization, however, the optical axis 15 and the longitudinal axis 13 are moved relative to one another, to cause image stabilization. The optical system 14 has an objective 16, a reversal system 17, and an ocular or eyepiece 18 as optical assemblies. In addition, still further optical assemblies can be provided. The illustration of the reversal system 17 as a prismatic reversal system is also to be understood as solely an example; any other reversal system, for example a lens reversal system, can also be implemented.

A transverse axis or lateral axis 20 of the long-range optical device 10 and a vertical axis 22 of the long-range optical device 10 form a Cartesian coordinate system together with the longitudinal axis 13. The longitudinal axis 15 forms the third axis 24, which is perpendicular to the vertical axis 22 and the transverse axis 20. Image stabilization can fundamentally cause translational movements in the direction of each of the three coordinate axes 20, 22, 24. In addition, the compensation of rotational movements is also possible, specifically a pitch movement 26 around the transverse axis 20, a yaw movement 28 around the vertical axis 22, and a roll movement 30 around the longitudinal axis 13 or 24. With respect to shaky movements or pivot movements, the pitch movements 26 and the yaw movement 28 are most significant. The image stabilization is described hereafter as an example on the basis of a long-range optical device 10 in which an image stabilization is performed to compensate for the rotational movements around the transverse axis 20 and the vertical axis 22, specifically the pitch movement 26 and the yaw movement 28. However, this is to be understood without restriction of the invention.

Figure 2:
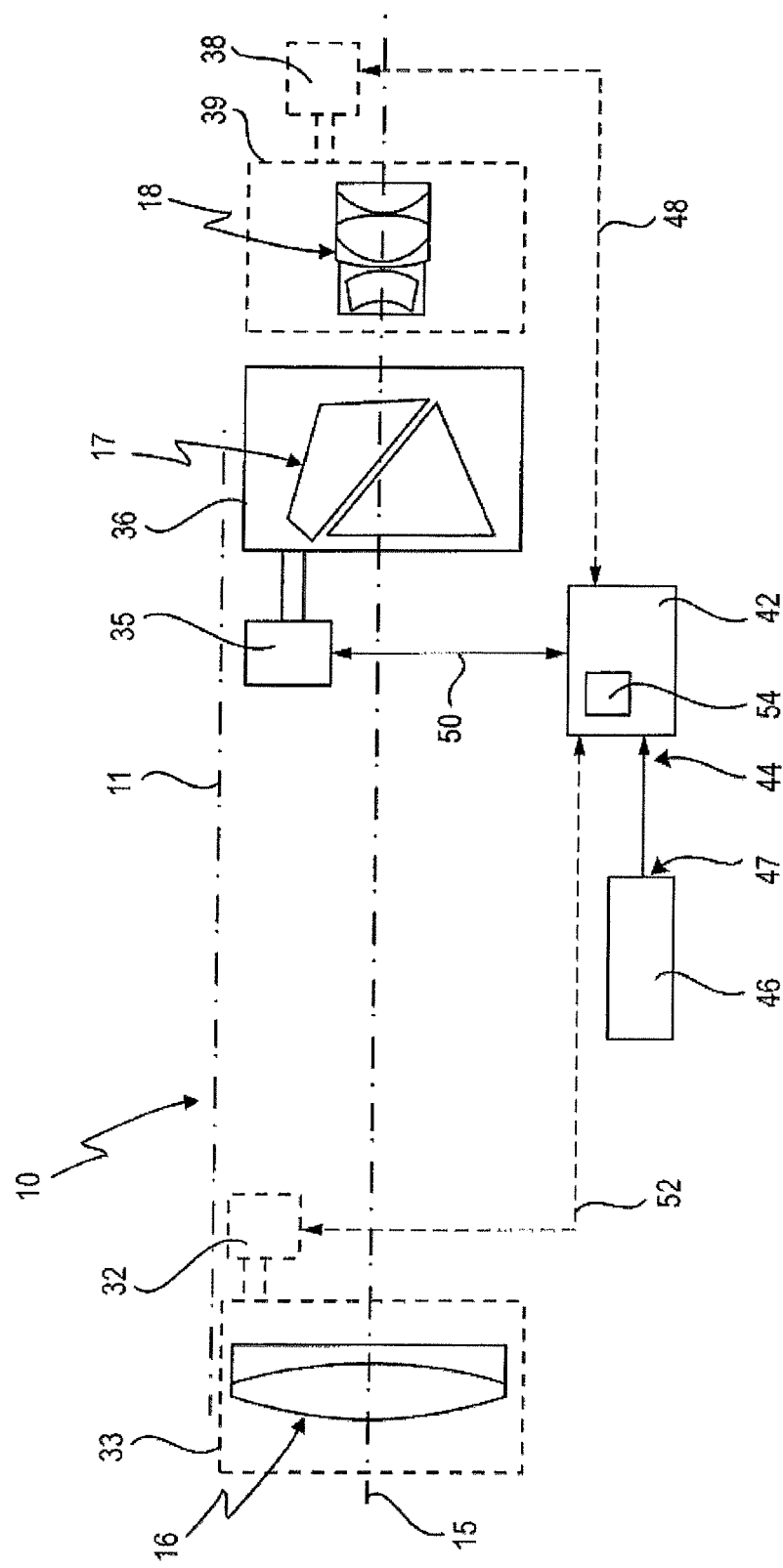
FIG. 2 shows a long-range optical device according to one embodiment in a lateral schematic illustration.

FIG. 2 shows a side view of a schematically simplified illustration of the first tube 11 of the long-range optical device 10. Actuators 32 of an image stabilization unit 33 of the objective 16, actuators 35 of an image stabilization unit 36 of the reversal system 17, and actuators 38 of the image stabilization unit 39 of the ocular 18 are shown. Only the image stabilization unit 36 having its actuators 35 is shown with solid lines. In the described exemplary embodiment, image stabilization is therefore performed solely by a tilt of the reversal system 17 around the vertical axis 22 and around the transverse axis 24. However, movements of the objective 16 and/or of the ocular 18 are fundamentally also possible in the scope of the present invention. Image stabilization units are also known, in which, for example, both the reversal system 17 and also the ocular 18 are moved jointly, i.e. by one image stabilization unit. The illustrated exemplary embodiment is therefore to be understood as solely an example. Only at least one of the optical assemblies 16, 17, 18 must be movable relative to the tube 11.

The long-range optical device 10 further has a signal processing unit 42, which provides the central signal processing in the long-range optical device 10. An input signal 44 is ascertained by at least one sensor element 46 and input into the signal processing unit 42.

The signal processing unit communicates by means of a corresponding line 48, 50, 52 with a regulating unit of a corresponding actuator 32, 35, 38 of a corresponding image stabilization unit 33, 36, 39.

The image stabilization is then performed by tilting of the reversal system 17 by the actuators 35 of the image stabilization unit 36. In this manner, the intermediate image is displaced within the optical system 14 such that a movement of the first tube 11 is compensated for. The actuation of the actuators 35 is performed by means of the signal processing unit 42. It is accordingly thus possible to adjust the reversal system 17 relative to the first tube 11, so that in this case a longitudinal axis 13 of the first tube 11 and an optical axis 15 can differ from one another. The illustration in FIG. 2 is to be understood solely as an example, as already stated above. Only at least one of the optical assemblies 16, 17, 18 must be movable relative to the first tube 11; other pivot points or curves of the optical axis 15 then also result accordingly. The behaviour is corresponding in the event of a compensation of translational movements by means of at least one of the optical assemblies 16, 17, 18.

To be able to tilt the reversal system 17 in the exemplary illustrated embodiment around both a vertical axis 22 and also around a transverse axis 20, it is suspended on a two-axis cardan joint (not shown), wherein the axes of the cardan joint are accordingly orthogonal to one another and perpendicular to the longitudinal axis 13. Two types of construction are primarily familiar to a person of average skill in the art for implementing the cardan joint; on the one hand, each axis of the cardan joint can be guided in two ball bearings, or leaf spring elements can be used as solid-state joints to suspend the reversal system. Solid-state joints have advantages of higher positioning precision, since they have less mechanical play, and more favourable production costs.

The actuators 32, 35, 38 are typically linearly movable actuators. These are arranged at a distance from the longitudinal axis 13 or the optical axis 15 via a lever, so that the linear movement is converted into a corresponding rotational movement. Above all, three types of actuators come into consideration: voice coil motors, stepping motors, and piezo linear drives.

If voice coil motors are used, an electromagnetic coil is fastened either on the reversal system, in an intermediate ring of the cardan joint or on the tube 11, or on an outer ring of the cardan joint. The pivot movement is again performed as an example on the basis of a provided image stabilization around the vertical axis 22 and the transverse axis 20. In the case of image stabilizations accordingly provided differently for rotational or translational movements, a person skilled in the art can carry out the appropriate alterations. A matching permanent magnet or also an electromagnetic coil is attached as the counterpart to the intermediate ring of the cardan joint, the first tube 11 or the outer ring, or the reversal system 17, so that upon the application of a current to the coil, a magnetic force arises between the components, which rotates the reversal system 17 around the corresponding rotational axis 20, 22. Since the voice coil motors have no retaining force, the cardan joints must additionally be mechanically locked before deactivating the image stabilization. For the case of a binocular long-range optical device 10, the cardan joints must be fixed in a locked state in the first tube 11 and the second tube 12 to one another such that a parallel beam passage is ensured, so that a user of the long-range optical device 10 does not receive a double image between the image of the optical system 14 of the first tube 11 and the image of the optical system 14' of the second tube 12, the so-called binocular alignment. In the case of the use of voice coil motors, no rigid coupling exists between the coil winding and the employed permanent magnet. Configurations of the cardan joint can also be selected in which the axial movements mutually influence one another. The actuators for both axes can thus be arranged, for example, on the first tube 11 or on the outer ring of the cardan joint. The permanent magnet for the first axis can be placed on the intermediate ring and the second permanent magnet can be placed on the prism system 17 itself. Therefore, no moving connection lines have to be used for the actuators.

In the case of the use of stepping motors, one stepping motor first drives a threaded spindle. A carrier, which executes a linear movement along the spindle, is driven by this threaded spindle. The spindle is connected via a lever to the reversal system 17, so that the linear movement is converted into a rotational movement. For this purpose, a motor is fastened on the first tube 11 or on the outer ring of the cardan joint and drives the inner ring of the cardan joint via a lever. The second motor is fastened on the inner ring of the cardan joint and drives the actual reversal system 17 via a lever. Through this arrangement, there is no mutual influencing of the two axes. The use of stepping motors having spindle drive has the advantage that very large retaining forces and large drive forces can be provided. Reversal systems 17 for large long-range optical devices 10 can thus also be moved efficiently and additional locking of the reversal system 17 can be omitted. In addition, stepping motors are very cost-effective as standard components.

Upon the use of a piezo linear drive, an oscillating piezoceramic is used in conjunction with a friction element as a counterpart. The opposing friction element is moved by oscillating the piezoceramic back-and-forth in different ways. The coupling between piezoceramic and friction element occurs via friction and contact forces. Since this coupling is not designed as rigid, the friction point can also be displaced perpendicularly to the movement direction, so that arrangements are also possible between two actuators which are not orthogonal to one another or which mutually influence one another. Therefore, both actuators for a first tube 11 can be fastened on the first tube 11 or on the outer ring of the cardan joint. The friction element of one actuator is then located on the inner ring and thus drives one axis; the friction element of the other actuator is then located on the reversal system 17 and drives the other axis. This construction simplifies the design in that none of the actuators are located on a moving part themselves. This decreases contacting problems, since moving lines do not have to be used. In addition, the weight of the inner ring is decreased, on which the second actuator would otherwise additionally be seated. A piezoactuator has a high setting precision while simultaneously having a high velocity, which increases the quality of the stabilization. Furthermore, it has a high degree of self-inhibition, so that additional locking can be omitted. In addition, a piezo linear drive is very efficient, so that the power consumption is low and long battery runtimes of the long-range optical device 10 can thus be achieved.

The position of the cardan joint is monitored using a Hall sensor for each axis. This is spaced apart from the corresponding pivot axis similarly to the corresponding actuators, so that a change of the rotational angle is converted into a linear movement, which is measured by the Hall sensor and can be input by a regulating unit of the actuators 32, 35, 38.

The respective angular velocities around the vertical axis 22 or the transverse axis 20, respectively, are detected by means of the at least one sensor element 46. From the corresponding measuring signals 47, the signal processing unit 42 then calculates a target tilt angle for actuating the actuators 35 of the image stabilization unit 36 and transmits it via the line 50 in the present exemplary embodiment. The controlling unit of the actuator 35 uses this target tilt angle as the target value of a control loop, which moves the reversal system 17 to this target tilt angle and holds it there by means of an actuator provided for a corresponding rotational movement of the reversal system 17 and a corresponding Flail sensor. This is a control loop, using which the velocity of a corresponding actuator is controlled by comparison of the signal from the corresponding Hall sensor and the corresponding calculated target tilt angle.

According to the above-described embodiment, a corresponding regulating unit is located in or on the actuator 35, i.e. it is part of the image stabilization unit 36. Fundamentally, it can also be provided that a corresponding regulating unit is an element of the signal processing unit 42; the signals transmitted via the line 50 would then change accordingly, for example the signal of the Hall sensors would be transmitted to the signal processing unit 42.

Fundamentally, it can be provided that the long-range optical device 10 is subjected in an installation step to a calibration, during which the real image deflection is measured for each tilt of the reversal system 17 set nominally via the control loop and is stored in the long-range optical device. The precision of the image stabilization can be increased by this calibration, since mechanical tolerances are compensated for. In the case in which the long-range optical device 10 is a binocular long-range optical device, the long-range optical device 10 can be aligned in a binocular manner here.

Figure 3:
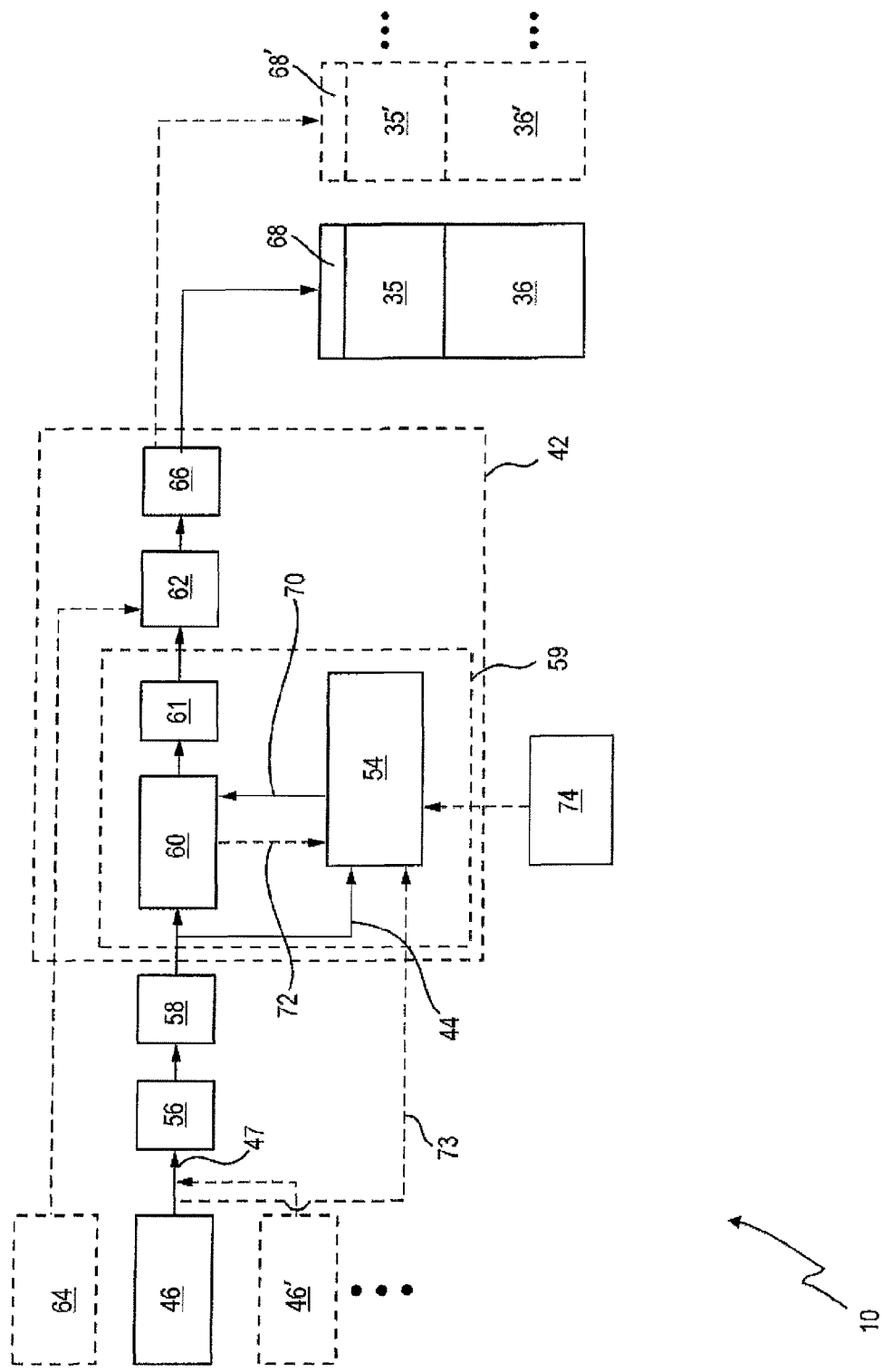
FIG. 3 shows a schematic illustration of the signal processing in the long-range optical device in FIG. 2.

FIG. 3 once again shows an exemplary structure of the signal curves in the long-range optical device 10 in a block diagram. At least one sensor element 46 ascertains a measuring signal 47. Fundamentally, more than one sensor element 46 can be provided, so that further sensor elements 46' deliver further measuring signals 47'.

The measuring signals 47 are converted into an input signal 44, which is described hereafter, and are then fed into a mode detection unit 54. The mode detection unit 54 is used for the purpose of differentiating between different modes for the actuation and fixing a mode for the actuation.

Signal filters 56 can be provided for filtering the measuring signal 44. The signal filters 56 can contain one or more low-pass filters, to eliminate high-frequency movements, which do not have to be compensated for, and the high-frequency part of noise of the measuring signal 47. For this purpose, a combination of an electrical or passive low-pass filter, a digital low-pass filter, and a digital shelving filter can be used in series. The respective filter types are fundamentally known to a person of average skill in the art. In this combination, a signal delay of only 45° occurs. A lesser delay of the measuring signal 47 is necessary to allow image stabilization in real time. The low-pass filters of the signal filters 45 fulfil the object of minimizing undesired noise and interference and also determining an upper limiting frequency of the image stabilization. Via the already above-described signal filters 45 and an analogue-to-digital converter 58, the input signals 44 are then fed to the signal processing unit 42, in particular central signal processing 59 having the mode detection unit 54 and a high-pass filter integrator unit 60.

The mode detection unit 56 can act on the high-pass filter integrator unit 60, in order to thus influence the actuation in each mode. The mode detection unit 54 at least outputs the current mode to the high-pass filter integrator unit 60.

In the exemplary implemented embodiment, the input signals 44 are angular velocities, so that the integrated signal is an angle. This signal is relayed from the integrator unit 44 to an amplitude offset unit 61, which will be explained in greater detail hereafter, and therefrom to a coordinate transformation unit 62, which converts the angle from the coordinate system of the sensor elements 46, 46' into the coordinate system of the image stabilization unit 36, 36'. In the case of a binocular long-range optical device 10, in which the first tube 11 and the second tube 12 are connected by means of a bending bridge or folding bridge, a bending bridge sensor 64 is also provided, which ascertains a bending bridge angle and transmits it to the coordinate transformation unit 62 provided in the signal processing unit 42, so that the bending bridge angle is also taken into consideration during the coordinate transformation. Fundamentally, the coordinate transformation unit 62 can also be arranged in the signal flow upstream from the integrator unit 44. Furthermore, a target signal generation unit 66 is schematically shown; this can convert the integrated target angle signals back into analogue signals again in particular and then outputs the matching target angle signal to a corresponding image stabilization unit 36, 36'. The image stabilization unit can be located in the first tube 11, for example. If a second tube 12 is provided, an image stabilization unit 36' arranged in the second tube 12 can also be actuated accordingly. For this purpose, the signal processing unit 42 communicates with a corresponding controlling unit 68, 68' of the respective image stabilization unit 36, 36', which controls the corresponding actuators 35, 35'. It can also be provided that the controlling units 68, 68' are also provided in the signal processing unit 42; in this case, corresponding position data flow back from the image stabilization units 36, 36' to the signal processing unit 42.

The mode detection unit 54 is connected to the high-pass filter integrator unit 60 and can communicate therewith. In particular the mode determined by the mode detection unit 54 is relayed via a signal line 70 to the high-pass filter integrator unit 60, in order to cause an actuation of the image stabilization units 36, 36' to occur in a specific mode. The type of data which are transmitted by means of the signal line 70 can be implemented differently. For example, only the mode can be transmitted; however, it can also be provided that already determined variables or parameters, which can be influenced and which are provided in the high-pass filter integrator unit 60, are transmitted. Furthermore, it can be provided that the high-pass filter integrator unit 60 can also transmit signals to the mode detection unit 54 by means of a signal line 72. This can be, for example, the mode currently applied in the high-pass filter integrator unit 60. In addition, for example, in the case in which the measuring signal 47 or the input signal 44 is an acceleration or angular acceleration, respectively, a signal integrated once to form a velocity or angular velocity, respectively, can be transmitted to the mode detection unit 54, so that in the case in which the measuring signal 47 or the input signal 44 is an acceleration or an angular acceleration, a determination of the mode or a movement situation can also be performed on the basis of a velocity signal or angular velocity signal.

Fundamentally, it is provided that the determination of the movement situation and therefore the mode is performed on the basis of the input signal 44, which has already passed through the signal filter 56 and the analogue-to-digital converter 58. In one embodiment, however, it can also be provided that the unfiltered measuring signal 47 is used by means of a signal line 73. An analogue-to-digital converter (not shown) can also be arranged in the signal line 73, to convert the signal accordingly.

Furthermore, an interface unit 74 can be provided. The interface unit can be, for example, a mechanical positioning lever or a mechanical positioning element; however, a software-based input capability, for example by means of a touch screen, can also be provided. By means of the interface unit 74, a user can input a desired application into the signal processing unit 42. In one embodiment, it can be provided that an input by means of the interface unit 74 has priority over an application ascertained by means of the mode detection unit 54.

In particular, the mode detection unit 56 is capable of differentiating between an image stabilization mode and a pivot mode. This is performed on the basis of an analysis of the input signal 44. As an alternative, it would also be conceivable to input the measuring signal 47 directly via a line 73 into the mode detection unit 54 and to carry out the analysis on the basis of the measuring signal 47. In particular, a probability-based determination of the pivot mode is performed as described hereafter. The determination of a pivot mode can be performed independently for the vertical axis 22 and the transverse axis 20, i.e. independently for each measuring signal 47, 47' of which the input signal 44 is composed. In the schematic illustration, the measuring signals 47, 47' of a serial type are shown on a bus; parallel processing is fundamentally also possible.

Figure 4A:
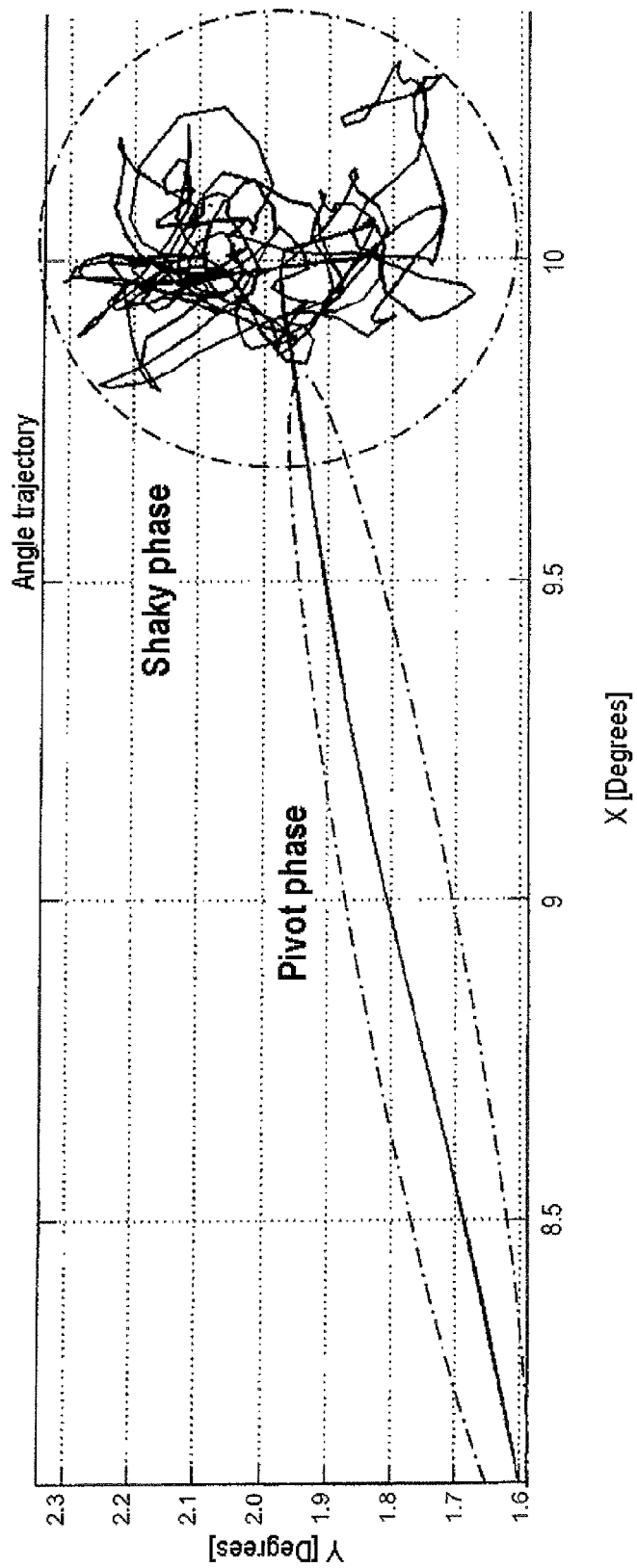
FIG. 4a shows a schematic curve of an angle trajectory during various movement situations.

FIG. 4a shows an example of the curve of an angle trajectory, as can occur during the use of the long-range optical device 10. The image stabilization of the long-range optical device 10 is performed around its vertical axis 22 and its transverse axis 20. A pitch movement 26 is plotted in the form of an angle x, a yaw movement 28 is plotted in the form of an angle y. The angle trajectory results when the angles x and y are plotted in pairs according to their time curve. The curve of the angle trajectory clearly shows two different movement situations. A first movement situation is identified as the "pivot phase", in which the user executes an intended movement using the long-range optical device 10. This movement situation is characterized by a uniform, nearly linear movement curve. In contrast, a second movement situation, a "shaky phase" or "jitter phase", can be recognized. During this movement situation, the user attempts to hold the long-range optical device 10 essentially in a specific alignment, in order to observe an object. During this movement situation, however, shaky movements of the user occur. These movements can possibly also originate from a supporting surface on which the user stands. The angle trajectory moves on the basis of the shaky movements nearly arbitrarily around a centre point, which can be assumed to be the alignment of the long-range optical device intended by the user. As can be recognized in FIG. 4a, these different movement situations can be differentiated well from one another upon an observation of a trajectory or the illustrated exemplary embodiment of an angle trajectory, respectively.

Figure 4B:
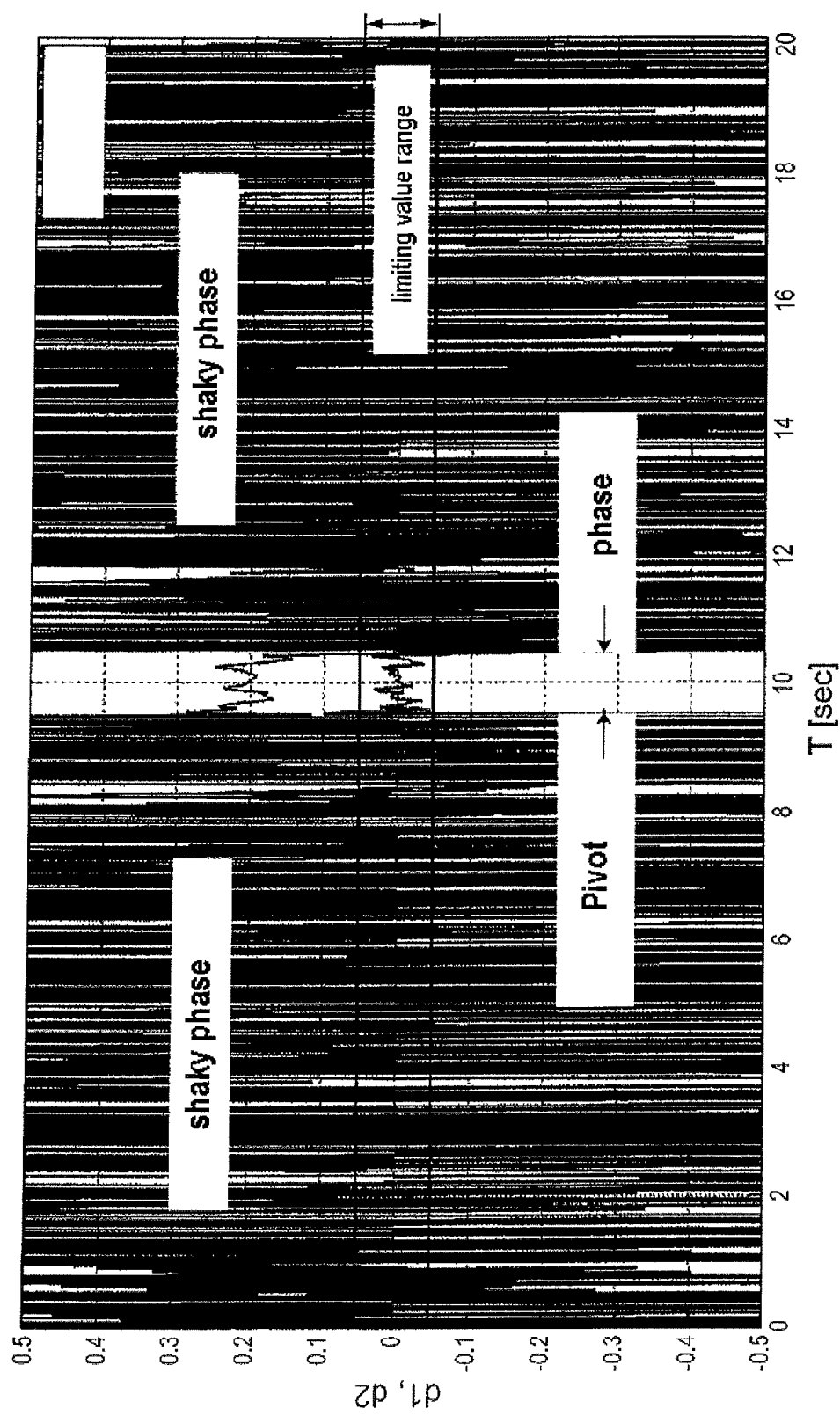
FIG. 4b shows a schematic illustration of a curve of a first and a second location derivative during the movement situations.

FIG. 4b shows a schematic illustration of the time curve of a first spatial derivative $$\frac{dy}{dx}$$

and a second spatial derivative $$\frac{d^2y}{dx^2}.$$

A shaky phase and a pivot phase are again identified in FIG. 4b. As can be recognized, a curve of both the first derivative and also the second derivative are nearly incomprehensible during a shaky phase. Because of continuous arbitrary direction changes during the shaky phase, a high-frequency signal having high amplitude results here for the signal of the first location derivative and also the second location derivative. It can also be seen, however, that during the intended pivot phase, both the first derivative and also the second derivative have a rather low-frequency curve of significantly lower amplitude. The first location derivative oscillates approximately around a value of 0.2° per second, the second derivative oscillates approximately around the value 0. On the basis of the curves, however, the presence of a specific movement situation may be determined precisely and rapidly.

Figure 5:
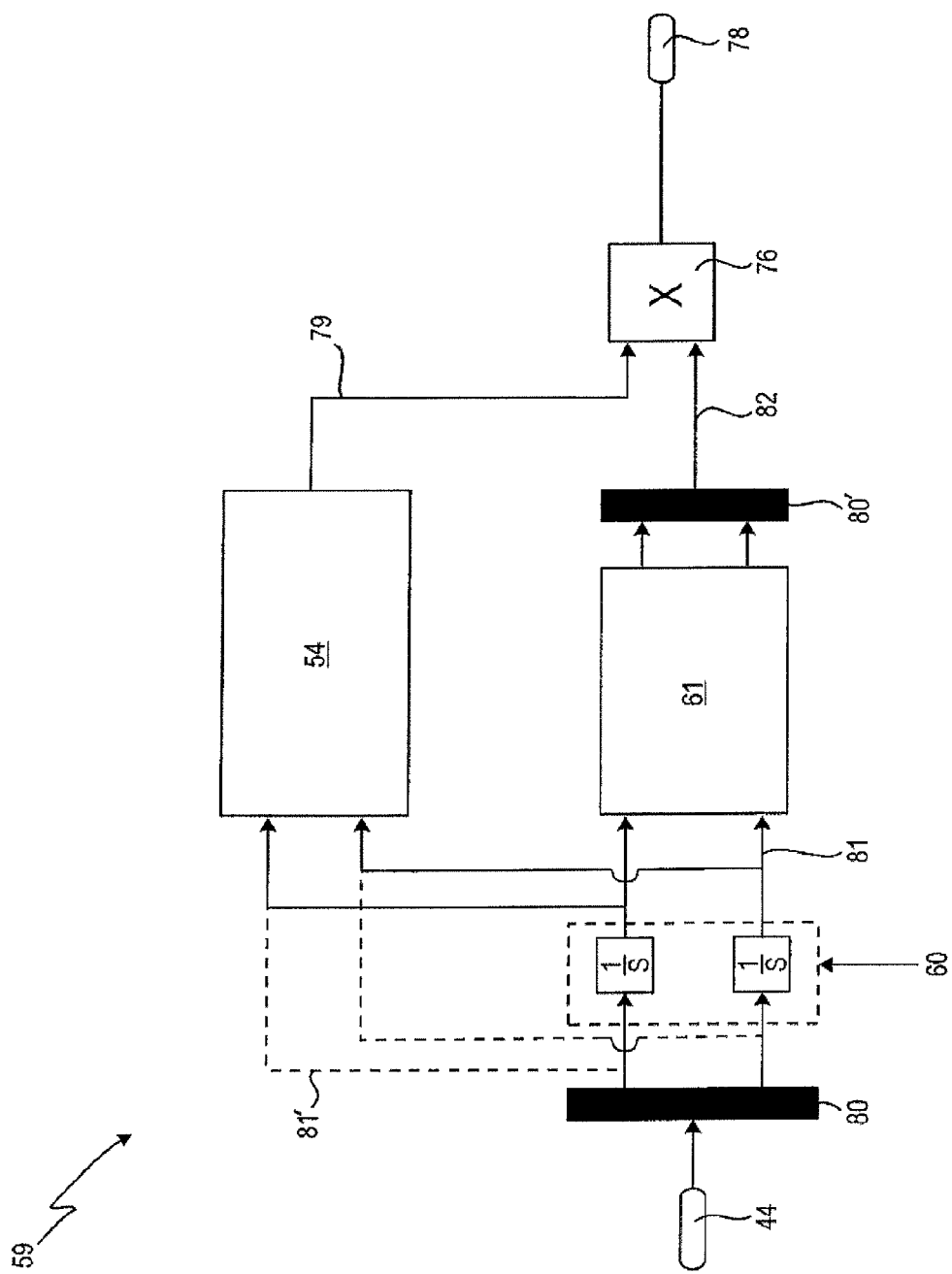
FIG. 5 shows a schematic illustration of a first embodiment of central signal processing.

FIG. 5 shows a possible embodiment of central signal processing 59 in the signal processing unit 42. The input signal 44 is input. This input signal is processed in the amplitude offset unit 61. Furthermore, a determination of the present movement situation and the assigned mode to actuate the image stabilization unit 36, 36' is performed in the mode detection unit 54. Accordingly, a multiplication is performed in a multiplication unit 76 to generate an output signal 78, which is transmitted to the coordinate transformation unit 62. Which signals are input into the multiplication unit 76 will be described hereafter.

In the illustrated embodiment, the input signal 44 has angular accelerations, which are ascertained by the sensor elements 46, 46', of both the pitch movement 26 and also the yaw movement 28. In a unit 80, these heretofore serially processed signals are allocated for parallel signal processing. However, this is to be understood solely as an example; fundamentally, signal processing can also be performed serially. The angular accelerations are integrated in the integrator unit 60, which has no further elements for providing high-pass filtering in the illustrated embodiment. Position signals 81, which are angle signals 81 in the present case, are ascertained in this manner. The angle signals 81 are input into the amplitude offset unit 61. Furthermore, the angle signals 81 are input into the mode detection unit 54.

As is shown hereafter, the angle signal 81 is first differentiated in the mode detection unit 54. It is therefore fundamentally possible to also input the angular accelerations 81' directly into the mode detection unit 54. After the amplitude offset unit 61, the angle signals 81 are again combined for serial processing in the unit 80'. The signal 82 now applied has already been corrected by a possible amplitude offset and is restricted to a maximum amplitude for actuating the image stabilization unit 36. This restricted signal 82 is then multiplied in the multiplication unit 76 with the output signal 79 of the mode detection unit 54. The output signal 79 is a reset signal and has either the value 0 or the value 1. The present central signal processing 59 is thus capable of actuating the image stabilization unit 36, 36' in two different modes, wherein a movement situation "intended movement" or "pivoting" is assigned to a first mode and a movement situation "unintended movement" or "shaky rotational movements" is assigned to a second mode. In the first mode, the angle signal 79 is a value 0, so that a value 0 is output as the output signal 78. During a pivot, the image stabilization unit 36, 36' is therefore guided in its basic position in an angle deflection of 0°. In the second mode, the output signal 79 has a value 1, so that the signal 78 transmitted to the coordinate transformation unit 62 corresponds to the restricted signal 82. The precise embodiment of the mode detection unit 54 and the amplitude offset unit 61 will be described hereafter.

Figure 6:
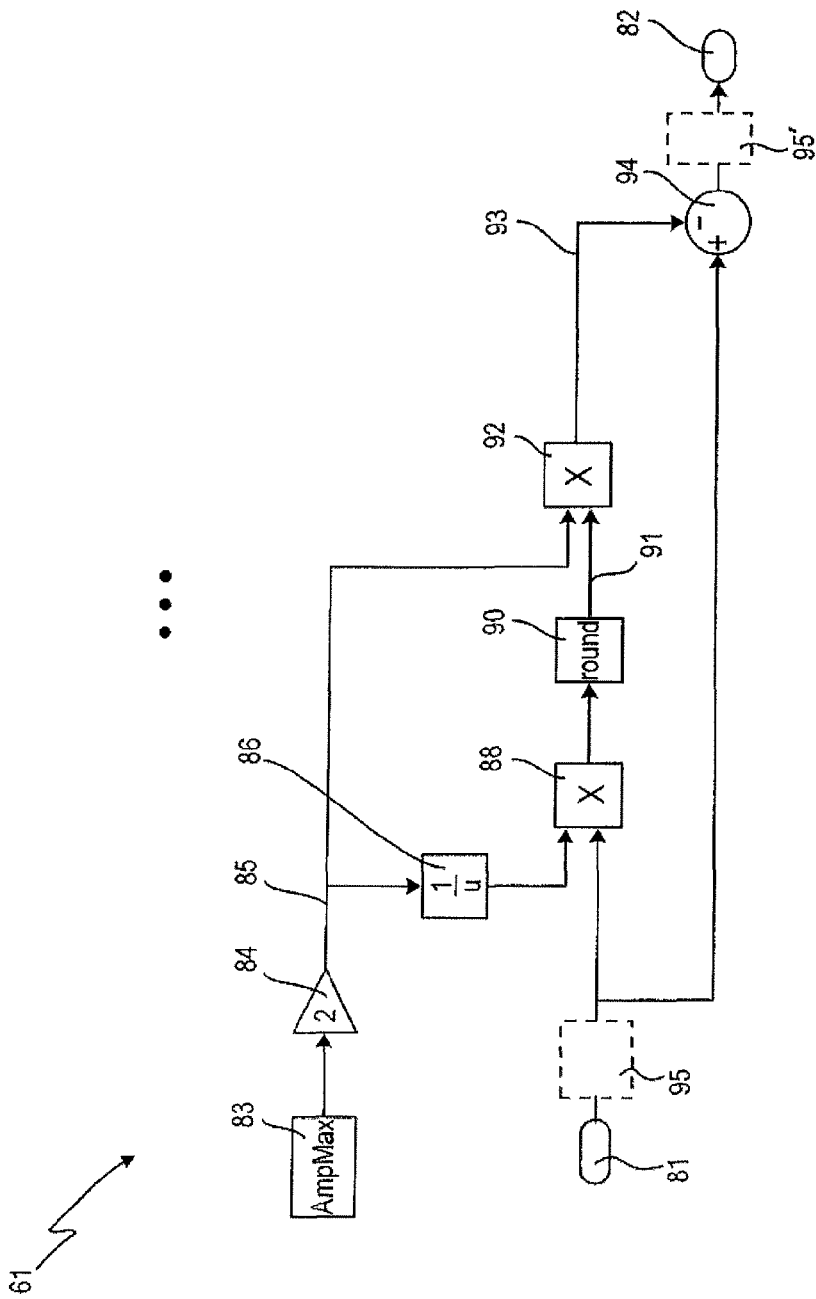
FIG. 6 shows a schematic illustration of one embodiment of signal processing to eliminate an amplitude offset in FIG. 5.

FIG. 6 shows an embodiment of the amplitude offset unit 61. The angle signal 81 is input into the amplitude offset unit 61. The processing of a single angle signal 81 is shown solely as an example. In the case of the input of two angle signals, as shown in FIG. 5, a corresponding parallel processing of both angle signals 81 occurs, wherein the processing of the further angle signals 81 corresponds to the processing shown in FIG. 6.

When reference is made in the scope of this application to a "block", this can also be understood as a "unit" as an element of the signal processing unit 42. Accordingly, a "block" or a "unit" can also be interpreted as a "step" of a corresponding method.

In addition to the angle signal 81, a maximum amplitude 83 is fixed, to which the angle signal 81 is to be restricted. The maximum amplitude 83 is doubled in a unit 84, so that a signal 85 corresponds to double the maximum amplitude 83. Before the signal 85, the reciprocal value is formed in a signal operation 86 and the corresponding reciprocal value is multiplied in a multiplication unit 88 by the angle signal 81. Instead of the signal operation 86 and the multiplication 88, it can accordingly also be provided that the angle signal 81 is divided by double the maximum amplitude 85 in the step or unit 88.

Subsequently, the signal generated by the multiplication unit 88 is rounded in a rounding operation 90 to a signal 91, which corresponds to the closest whole number. The rounding within the rounding operation 90 is performed in a known form, wherein it is rounded according to a first decimal place. A value X.5 represents the rounding limit. A value greater than or equal to X.5 is rounded up to the closest higher whole number, less than this is rounded down to the closest lower whole number. This closest whole number 91 is then multiplied in a multiplication unit 92 by double the maximum amplitude 85 and a subtraction value 93 is thus generated. In a summation block 94, the subtraction value 93 is then subtracted from the angle signal 81 and the restricted signal 82 is thus generated.

By means of the illustrated amplitude offset unit, it is possible to restrict an angle signal 81 to a maximum amplitude 83 without a time delay and additionally to eliminate a possibly existing amplitude offset. In particular, it is possible to separate a shaky rotational movement, which is a high-frequency signal, from a possible slow pivot movement, which is a very low-frequency signal. The illustrated signal processing allows a delay-free separation, which is directed forward in the signal curve, of the shaky rotational movements, which have high frequencies and small amplitudes, from low-frequency pivot movements. The output signal 82 accordingly only still contains the shaky rotational movements, which can thus be tracked by the image stabilization unit 36, 36'. The illustrated interconnection functions up to a maximum amplitude of 1.0. Scaling factors 95, 95' can be provided accordingly. On the basis of these scaling factors 95 and 95', the angle signal 81 is first divided by the scaling factor in a signal operation 95. An output value of the addition block 94 is then multiplied accordingly by the same scaling factor in a signal operation 95'. In this manner, larger maximum amplitudes may also be handled and the regulating signal 81 may be restricted accordingly. For example, if the maximum amplitude is 2.0, the scaling factor in the signal operations 95, 95' would accordingly be selected to be 2.

The scaling factors 95 and 95' can be fixed separately for each angle signal 81. In particular, it has been shown that good processing of the angle signals 81 can be performed if the maximum amplitude 83 can be fixed at a value of 0.5. Correspondingly thereto, the respective angle signals 81 are to be scaled by means of the scaling factors 95, 95' such that a relative amplitude or the amplitude of the high-frequency components of the angle signals 81 is less than 0.5. The size of the scaling factors 95, 95' must be known for this purpose. For this purpose, it can be provided that the corresponding scaling factors 95, 95' are ascertained in general or respectively for a specific application by means of previously carried out experiments. For example, measurements can be carried out, while experimental personnel use the long-range optical device 10 in a typical manner. Typical signal curves of the angle signals 81 can thus be ascertained and corresponding scaling factors 95, 95' can be fixed.

Figure 7:
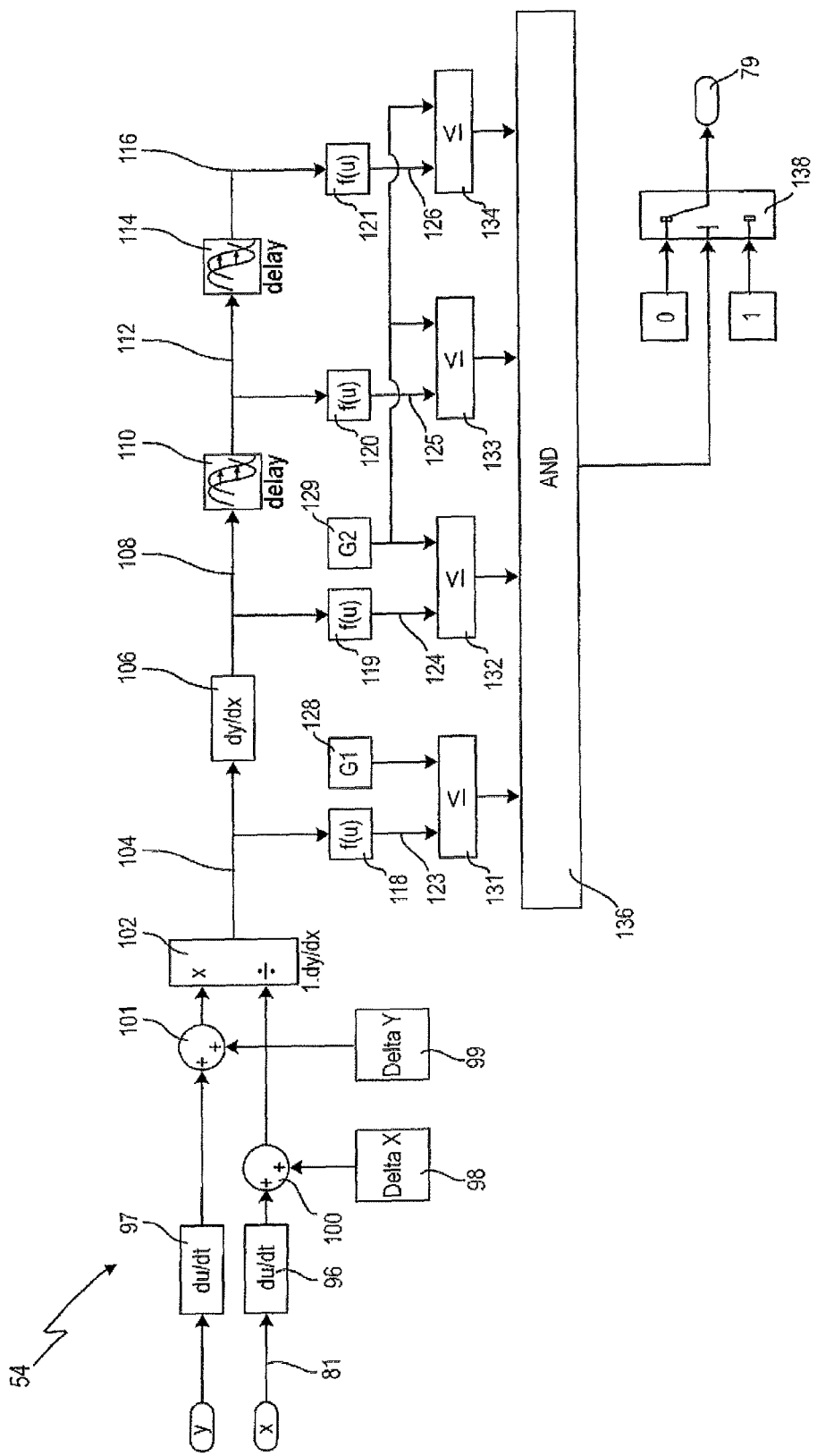
FIG. 7 shows a schematic illustration of signal processing to determine a mode of an image stabilization unit and an assigned movement situation in FIG. 5.

FIG. 7 shows an embodiment of the mode detection unit 54. Angle signals 81 are input into the mode detection unit 54, as shown in FIG. 5. The angle signals 81 are first differentiated in differentiation operations 96, 97. If angular velocities 81' are input directly into the mode detection unit 54, as is schematically indicated in FIG. 5 by the reference sign 81', the differentiation operations 96, 97 are accordingly omitted. Constants 98, 99 are applied to the differentiated signals. The constants 98, 99 are added in addition blocks 100, 101 to the differentiated signals. Subsequently, in a block 102, a first differentiated angle signal is divided by the second differentiated angle signal, to generate a corresponding spatial derivative or location derivative $$\frac{dy}{dx}.$$

Of course, a corresponding different spatial derivative or location derivative $$\frac{dx}{dy}$$

can also be generated. The application with the constants 98, 99 is performed so that the division can be executed in the block 102 and a division by zero or a very small value does not occur, which would in turn result in an extremely large value of a spatial derivative which could only be handled with difficulty. The constant 98 can have a value of 0.1, for example. The constant 99 can have a value of 0.001, for example.

The first spatial derivative or the first location derivative forming a first location derivative value 104 is then differentiated a further time in a block 106, so that the second location derivative or the second spatial derivative results therefrom, which forms a second location derivative value 108. In a block 110, this signal 108 is delayed by a specific period of time, so that the location derivative value 112 corresponds to the location derivative value 108 at an earlier point in time. The location derivative value 112 is delayed again in a block 114, so that the location derivative value 116 corresponds to the location derivative value 112 at an earlier point in time or the location derivative value 108 at a still earlier point in time.

The location derivative value 104 is then subjected to a function operation 118, the location derivative value 108 to a function operation 119, the location derivative value 112 to a function operation 120, and the location derivative value 116 to a function operation 121. The function operations 118, 119, 120, and 121 can be, in the illustrated example, for example, the formation of the absolute value norm of a corresponding signal 104, 108, 112, and 116. However, it is also fundamentally possible that p-norms or also mean values are formed in the function operations 118, 119, 120, and 121.

By means of the function operators 118, 119, 120, 121, comparative values 123, 124, 125, 126 are thus formed from the location derivative values 104, 108, 112, and 116. The comparative values 123, 124, 125, 126 are then compared to limiting values 128, 129. Fundamentally, a separate limiting value 128, 129 can be fixed for each comparison. In the illustrated embodiment, a first limiting value 128 is provided for the comparison of the comparative value 123 and a comparison is performed by means of a comparison operator 131. A second limiting value 129 is provided for the comparative values 124, 125, 126, and a corresponding comparison of one of the comparison operators 132, 133, 134 is performed.

The illustrated embodiment with the formation of four comparative values 123, 124, 125, 126 and the type of the location derivative values 104, 108, 112, 116 is only to be understood as an example; it is fundamentally sufficient if at least one comparative value 123, 124, 125, 126 is formed. The illustrated embodiment allows a specific movement situation, in the present case an intended movement or a pivot of the long-range optical device 10, to be detected particularly precisely, however.

A logic gate 136, which logically links the results of the comparison operations 131, 132, 133, 134, adjoins the comparison operations 131, 132, 133, 134. In the illustrated embodiment, the logic gate 136 is designed as a simple AND gate. The logic gate 136 therefore delivers a true statement if each of the comparison operations 131, 132, 133, 134 results in a true statement. This is presently the case if both the first location derivative and also the second location derivative and the corresponding delayed signals of the second location derivative are less than or equal to the set limiting values 128, 129. As explained with reference to FIG. 4, the absolute values of the location derivatives in the event of an intended movement or a pivot are low in comparison to the state during an unintended movement or a shaky movement. The first limiting value 128 can be fixed at 0.7 in the unit (degrees/s), for example, and the second limiting value 129 can be fixed at 6 in the unit (degrees/s$^2$), for example.

Fundamentally, of course, other values can also be fixed for the limiting values 128, 129. For example, the limiting values can be previously calibrated by measurements on the long-range optical device 10. Measurements can also be carried out here, while experimental personnel use the long-range optical device 10 in a typical manner. In particular, for example, the limiting value 128 can be in a range from 0.6 to 0.8; in particular, for example, it can thus be 0.6, 0.65, 0.75, or 0.8. In particular, for example, the limiting value 129 can be in a range from 5 to 7; in particular, it can thus be, for example, 5, 5.5, 6.5, or 7.

Finally, a switch 138 is provided, which switches a value 0 or 1 in accordance with the statement of the logic gate 136. If the statement of the logic gate 136 is true, i.e. if there is an intended movement or a pivot, the output signal 79 has the value 0; if the statement is untrue, the output signal 79 has the value 1.

Figure 8:
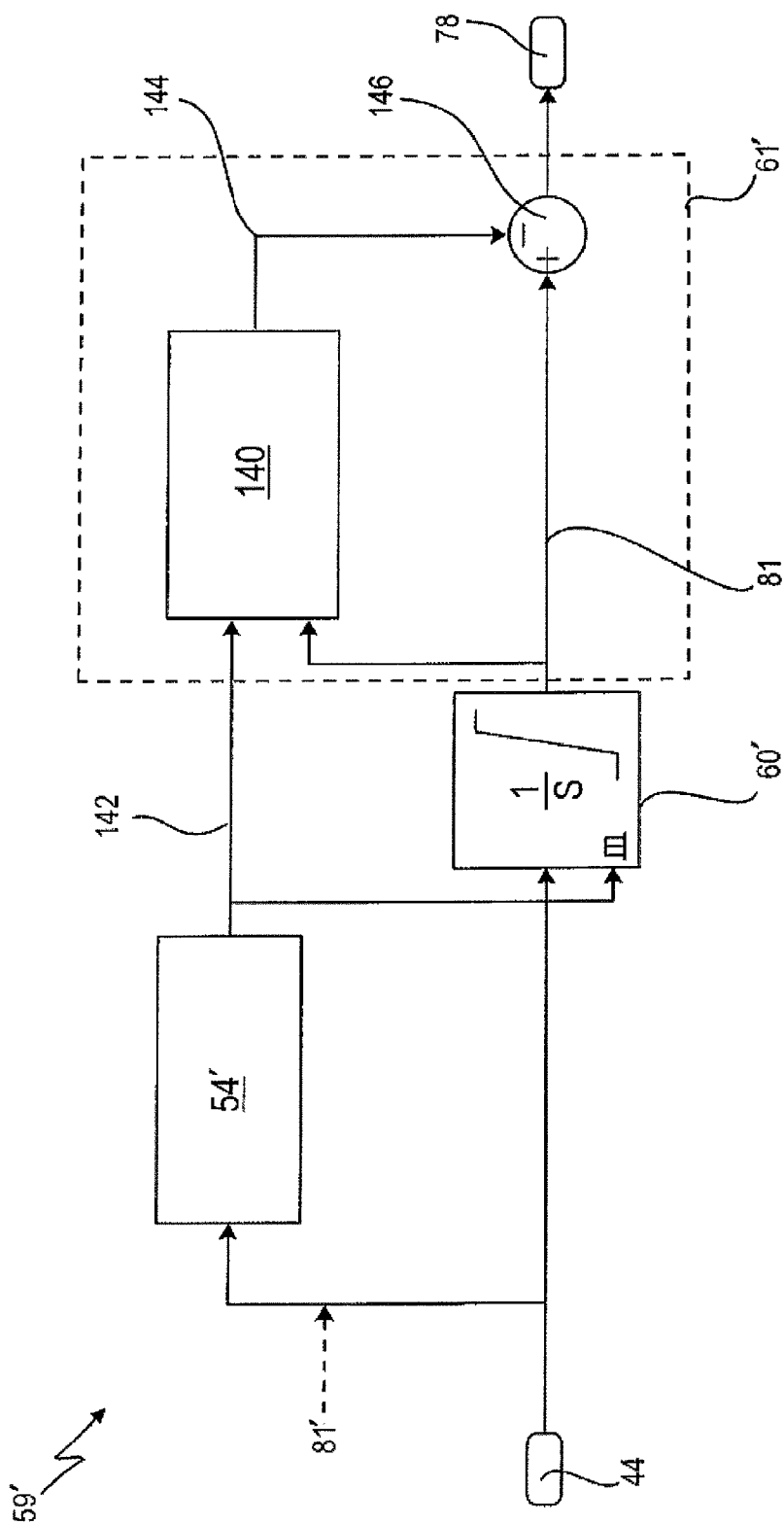
FIG. 8 shows a further embodiment of central signal processing.

FIG. 8 shows a further possible embodiment of the central signal processing 59'. This embodiment fundamentally also has a further embodiment of a mode detection unit 54', a further embodiment of an integrator unit 60', and a further unit 61', which forms an amplitude offset unit 61'. The units of the central signal processing 59' shown in FIG. 8 can fundamentally be combined with the units of the central signal processing 59 shown in FIG. 5. For example, the mode detection unit 54' can also be used in the central signal processing 59 or the mode detection unit 54 can be used in the central signal processing 59' shown in FIG. 8.

In the embodiment shown in FIG. 8, the input signal 44, which is provided in the form of angular velocities output by sensor elements 46, 46', is input to the integrator unit 60' and to the mode detection unit 54'. Therefore, a position signal in the form of an angle deflection is not input into the mode detection unit 54', but rather the input signal 44, which is provided in the form of a first derivative according to time of the position signal or the angle signal; it therefore corresponds to the signal 81' shown in FIG. 5.

The amplitude offset unit 61' has a unit for averaging or an averaging unit 140. The position signal 81 originating from the integrator unit 60' and a reset signal 142 ascertained by the mode detection unit 54' are input into the averaging unit 140. The reset signal 142 is also input into the integrator unit 60'. The reset signal is in particular a Boolean signal, which assumes the value 1 or the value 0. The mode detection unit 54' therefore likewise differentiates between precisely two modes. A movement situation, which corresponds to an intended movement or a pivot movement, is assigned to the first mode, and a movement situation, which corresponds to an unintended movement or a shaky rotational movement, is assigned to a second mode.

The reset signal 142 is formed such that the signal is true during the presence of a pivot procedure and therefore it triggers a reset of the integrator unit 60'. The position signal 81 originating from the integrator unit 60' during an intended pivot procedure is therefore zero again. The position signal 81 is therefore also first zero at the end of a pivot procedure and in the event of a renewed change into the second mode, in which the shaky rotational movements are compensated for. During an intended pivot procedure, an image stabilization unit 36, 36' is therefore guided back into its basic position, so that, on the one hand, no image stabilization occurs during an intended pivot movement and, on the other hand, no amplitude offset can be generated by the intended pivot movement.

Therefore, only a possible slow pivot movement must still be dealt with, which is not recognized by the mode detection unit 54', since it occurs very slowly and with continued shaky rotational movements and therefore cannot be detected. This is performed accordingly in the amplitude offset unit 61', as explained hereafter. A mean value of the angle deflections over a specific preceding period of time is ascertained by the averaging unit 140, of which it is presumed that this value reflects the location of the long-range optical device 10 desired by a user. This mean value is output as a mean value signal 144, which is then subracted in a subtraction unit 146 from the position signal 81. In this manner, it is possible to filter out a slow and very low-frequency movement or angle deflection of the long-range optical device 10 from the position signal 81. The output signal 78, which is transmitted to the coordinate transformation unit 62, only still has the high-frequency shaky rotational movement components, which essentially oscillate around the zero location.

Figure 9:
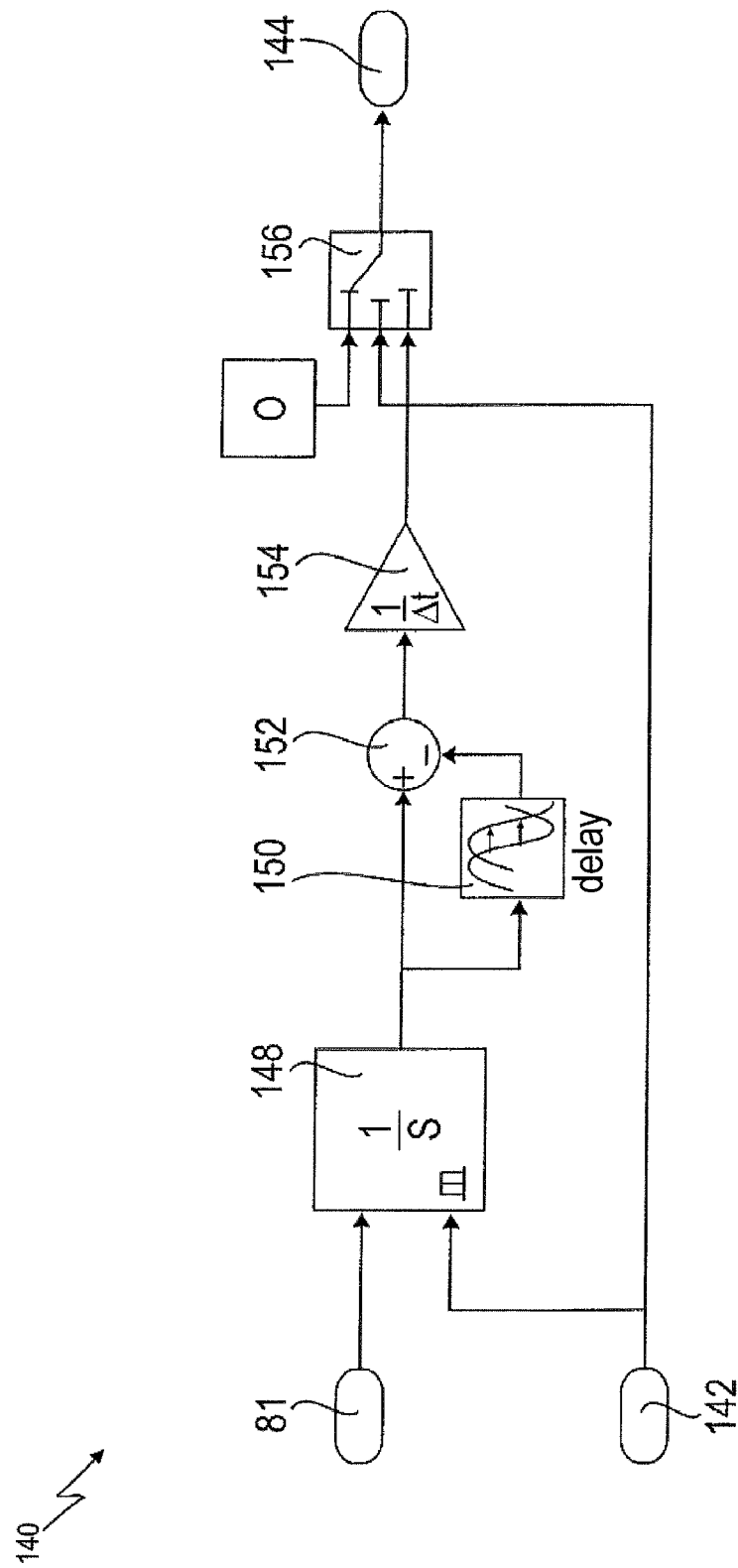
FIG. 9 shows a schematic illustration of the ascertainment of a mean value to eliminate the amplitude offset during slow pivot movements in FIG. 8.

FIG. 9 shows an embodiment of the averaging unit 140. The position signal 81, which is provided in the form of an angle deflection, and the reset signal 142 are input. The angle signal 81 is first integrated in an integrator unit 148, wherein the reset signal causes a reset of the integrator unit 148 to zero during a pivot procedure, i.e. in the first mode. An output signal of the integrator unit 148 is delayed in a delay element 150 by a specific period of time. This specific period of time is permanently predefined. In a block 152, the output signal of the integrator unit 148 is then decreased by this delayed signal. The block 152 therefore more or less only outputs the signal of the angle signal 81 integrated over the specific period of time. This value is accordingly divided in a block 154 by the duration of the specific period of time, so that the output of the block 154 is the mean value with respect to time over the specific period of time of the angle signal 81. This value is input into a switch 156, which is also switched by the reset signal 142. During the pivot procedure, the switch outputs the value zero, so that the mean value 144 is zero. Otherwise, the value output by the block 154 is output, i.e. during the second mode, in which a compensation of shaky rotational movements occurs.

Figure 10:
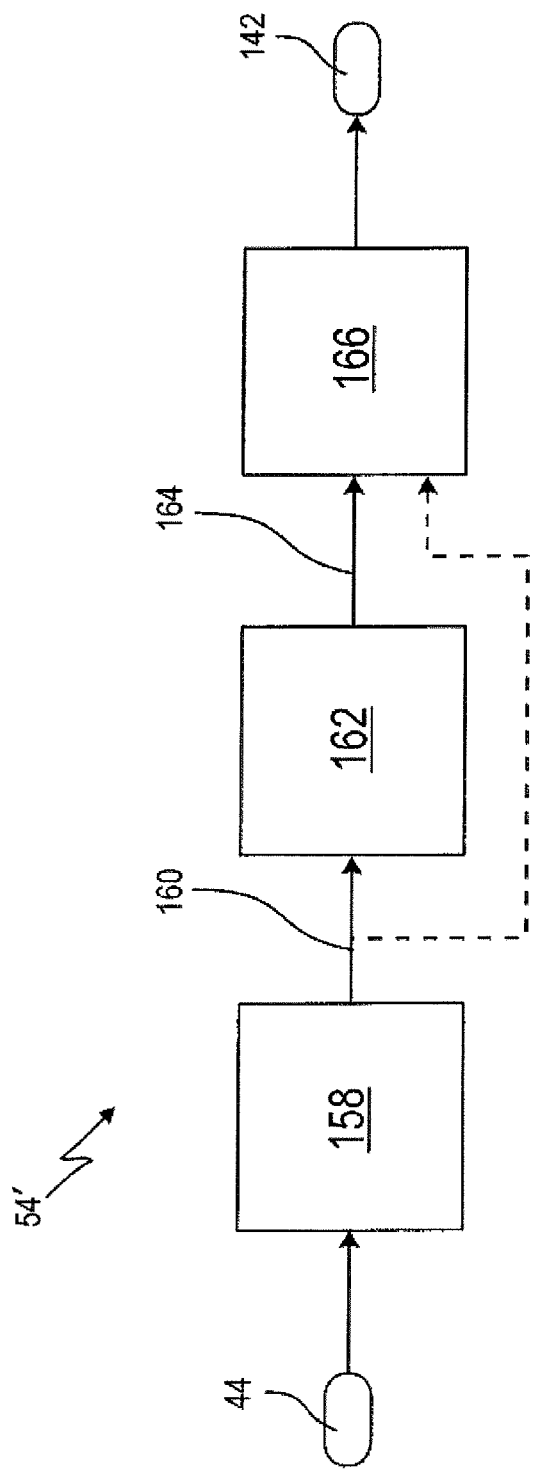
FIG. 10 shows a schematic illustration of a further embodiment of signal processing for determining a specific mode of an assigned movement situation in FIG. 8.

FIG. 10 schematically shows a construction of the mode detection unit 54'. The input signal 44, which is already provided in the form of first derivatives with respect to time of the angle signal or in the form of angular velocities, is input into the mode detection unit 54'. The construction of the embodiment of the mode detection unit 54' is depicted in three steps for the sake of clarity. Firstly, in a block 158, a minimum of location derivatives is formed, and a corresponding output signal 160 is transmitted to a block 162. Block 162 forms a p-norm of the minimum signal 160 and accordingly outputs a norm signal 164 to a comparison block 166. A corresponding reset signal 142 is output from the comparison block 166. Furthermore, it can be provided in particular that the minimum signal 160 is also input into the comparison block 166. The individual blocks of the mode detection unit 54' are again exchangeable in corresponding signal processing sections of the mode detection unit 54 shown in FIG. 7, thus, for example, the comparison block 166 or the block 158 for a minimum formation, as explained hereafter.

Figure 11:
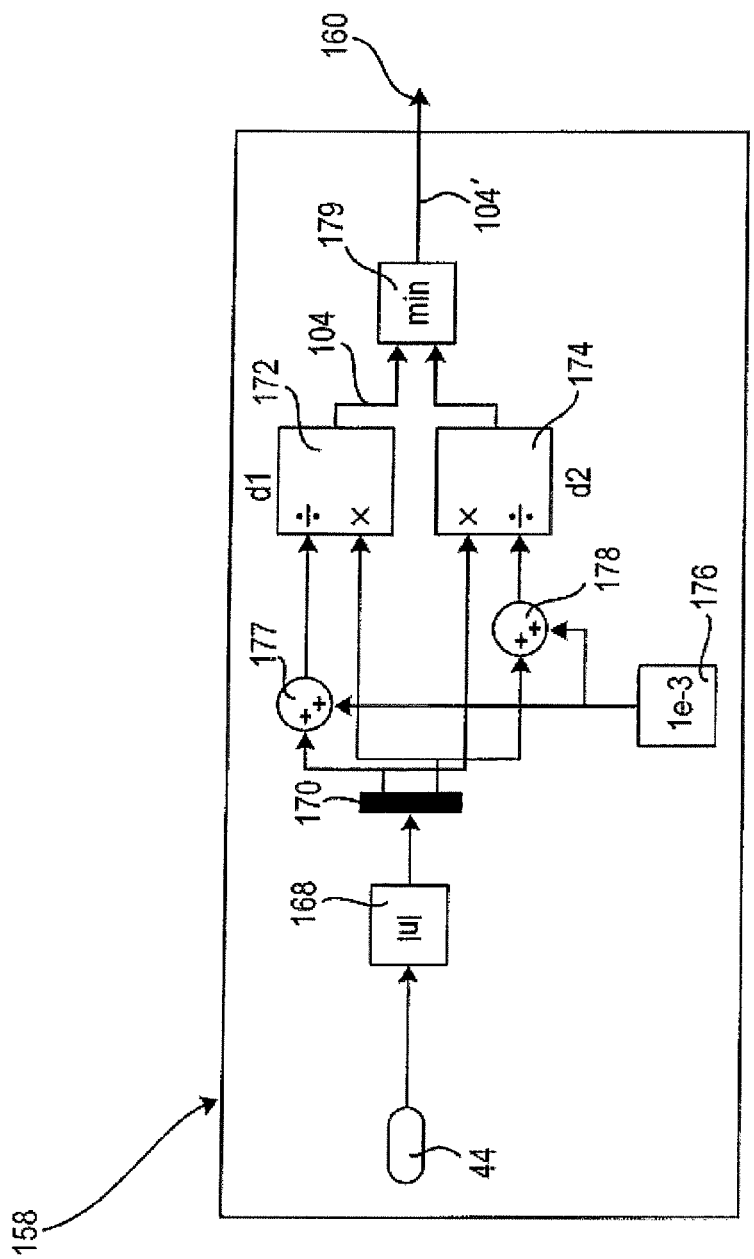
FIG. 11 shows a schematic illustration of a first section of the signal processing in FIG. 10.

FIG. 11 shows the embodiment of the block 158 for minimum formation. The input signal 44 in the form of angular velocities around the vertical axis 22 and the transverse axis 20, as were determined by the sensor elements 46, 46', is input into the block 158. An absolute value of the input signal 44 is first formed in a block 168. The two angular velocities, which were heretofore processed serially, are separated and are now provided in separate form in a block 170; fundamentally, parallel signal processing can also be performed, so that the block 170 is only used for explanation. The angular velocity or first derivatives with respect to time of the angle signals are then input accordingly into two blocks 172, 174, where they are divided to form spatial derivatives in both directions of the angle trajectory, i.e. both a derivative $$\frac{dy}{dx}$$

and also a derivative $$\frac{dx}{dy},$$

respectively. After the blocks 172, 174, first location derivatives are accordingly provided. It can be provided that a constant 176, for example of the value 0.001, is added in summation blocks 177, 178 to a respective divisor of the blocks 172, 174, to avoid division by zero. The minimum of the output signals of the blocks 172, 174 is then ascertained in a block 179. This minimum is, because of the absolute value formation in the block 168, the absolute value minimum of the two location derivatives or spatial derivatives $$\frac{dy}{dx} \text{ or } \frac{dx}{dy},$$

respectively. The output signal of the block 179 then corresponds to the minimum signal 160.

The minimum signal 160 is equivalent to the location derivative value or signal 104 shown in FIG. 7 and can therefore also be designated as the signal 104'. Accordingly, the ascertainment of the signal 104 shown in FIG. 7 can also be replaced with the ascertainment of the signal 160 shown in FIG. 11 and vice versa. In the event of an intended pivot procedure, one of the two spatial derivatives is typically small. Therefore, the ascertainment shown in FIG. 11 of a location derivative value 160 is somewhat more reliable and precise in the case of the ascertainment of a movement situation which corresponds to an intended pivot procedure and therefore in the case of the determination of the assigned first mode.

Figure 12:
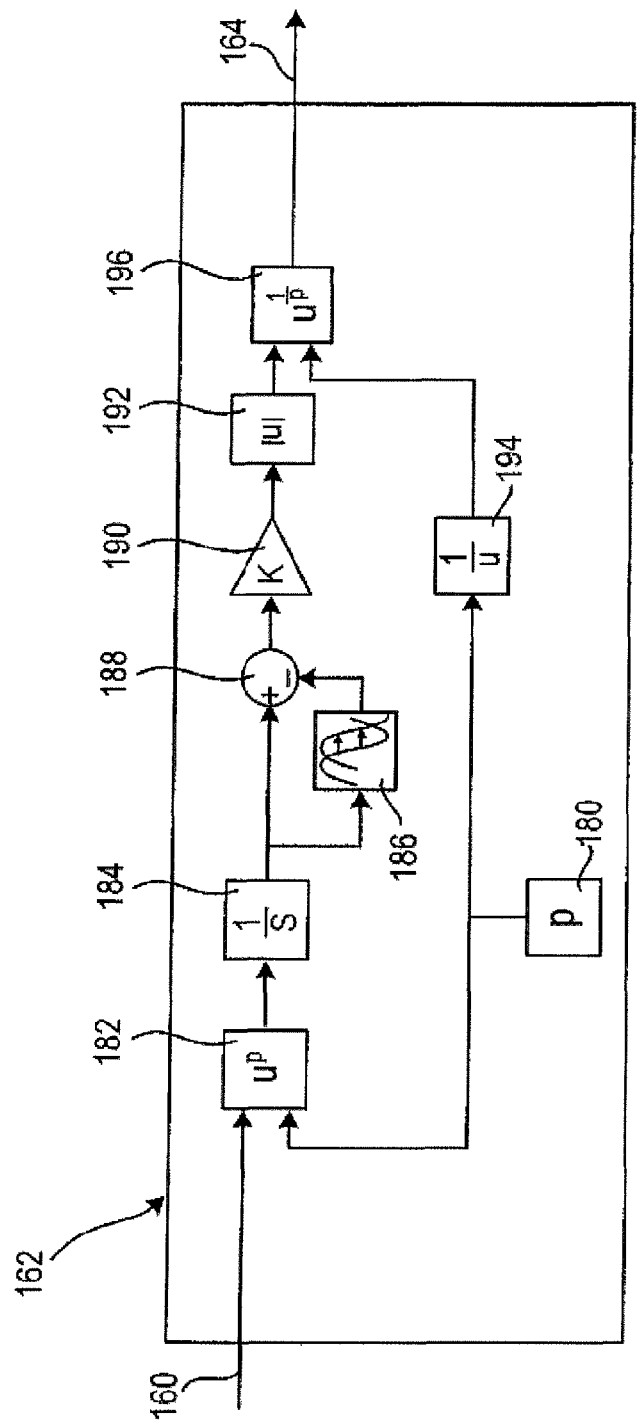
FIG. 12 shows a schematic illustration of a second section of signal processing in FIG. 10.

FIG. 12 shows a block 162 to form a norm. The minimum signal 160 is input into the block 162. The output signal 164 of the block 162 is the norm signal. The type of the norm is fixed for the p-norm in a block 180. For example, for a value p=2 in block 130, the Euclidean norm results. Any arbitrary integer greater than zero can be input, however. A value of p=16 can be preferable. The value p is input as an exponent in a block 182 and the minimum signal 160 is accordingly raised to this exponent. It is subsequently integrated in a block 184. The integrated signal is again delayed by a further specific period of time in a block 186 and this delayed value is subtracted in a block 188 from the integrated signal of the block 184. Finally, the integral is thus ascertained over the further specific period of time. In a block 190, this signal is then divided by the duration of this further specific period of time. The absolute value of this signal is formed in a block 192. The value p fixed in the block 180 is formed in a block 194 as a reciprocal value, which is then entered as the exponent in a block 196. In the block 196, the output signal of the block 192 is raised to the reciprocal value formed in the block 194, so that the norm signal 164 results as output signal of the block 196.

Figure 13:
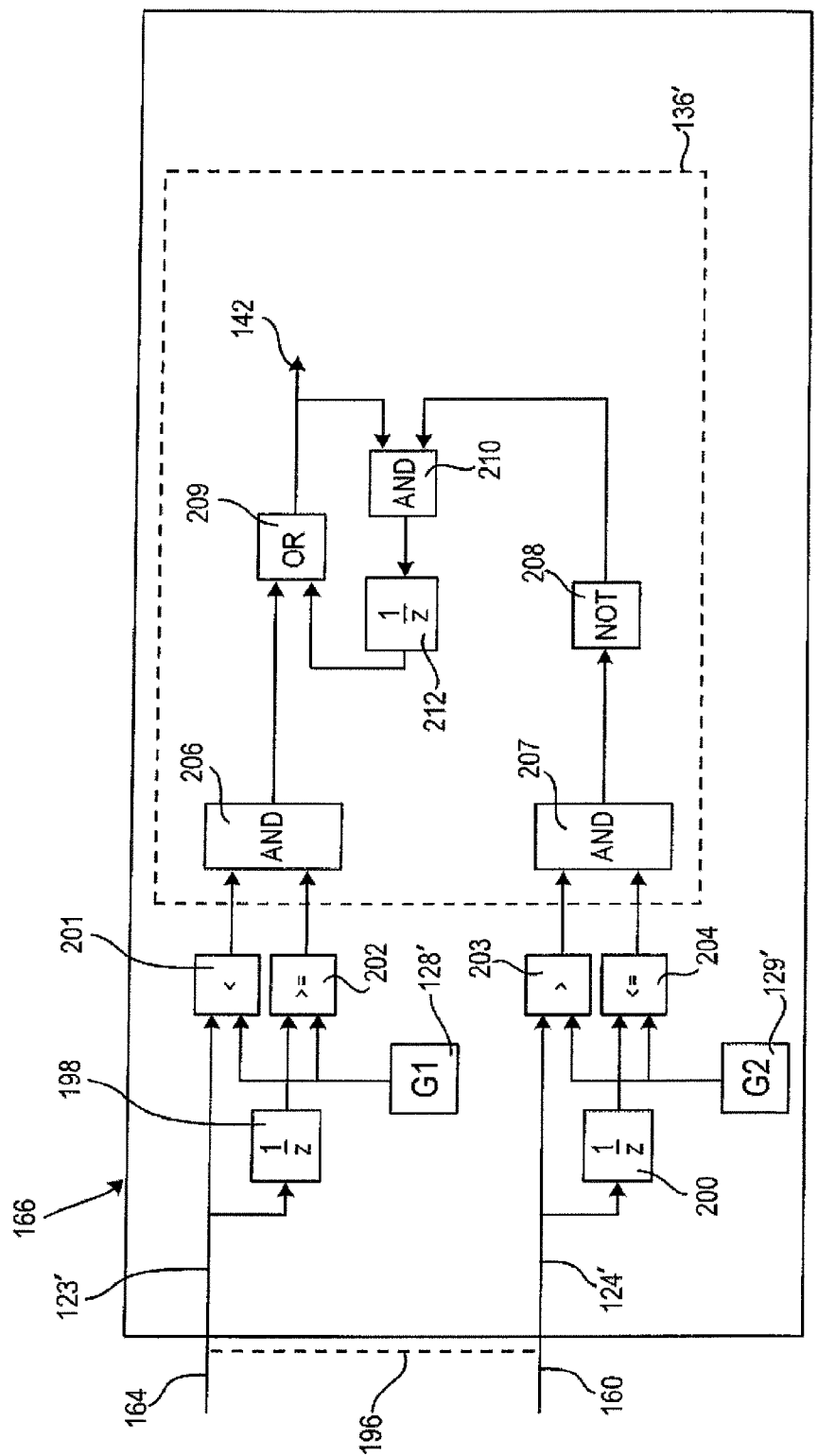
FIG. 13 shows a schematic illustration of a third section of signal processing in FIG. 10.

FIG. 13 shows the construction of the comparison block 166. The comparison block 166 also carries out comparisons between comparative values and limiting values, as explained hereafter. Subsequently, a more complex linkage of logical queries is performed, which can be designated essentially as equivalent to the logic gate 136 in FIG. 7 and which is identified by 136'. The embodiment of the block 166 shown in FIG. 13 is also fundamentally equivalent to the comparison operations 131, 132, 133, 134 and the logic gate 136 in FIG. 7 and can be exchanged accordingly. For example, it can be sufficient to execute the block 16 as a simple comparison operation with the limiting value 128', after which the output true or untrue statement is used as the reset signal 142. This embodiment shown in FIG. 13 has a somewhat more robust construction, however, and in particular allows very rapid recognition of an end of a movement situation, which corresponds to an intended movement or a pivot procedure.

The norm signal 164 ascertained as described above is input into the block 166. Furthermore, the minimum signal 160 is directly input. The end of a pivot procedure is to be recognized therefrom in particular, since it is not subject to a specific delay like the norm signal 164. However, this is not necessarily required. As indicated in a signal curve 196, the norm signal 164 can also be used for the detection of both a beginning and also an end of a movement situation, which corresponds to an intended movement or a pivot procedure. The use of the minimum signal 160 allows more rapid recognition, however.

Two limiting values 128', 129' are fixed, wherein the value 128' forms a limiting value to determine a beginning of the movement situation, which corresponds to a pivot procedure, and the limiting value 129' is provided for the purpose of forming the limiting value to determine an end of the corresponding movement situation.

Similar statements as for the limiting values 128, 129 apply for the limiting values 128', 129'. Fundamentally, of course, different values can also be fixed for the limiting values 128', 129'. For example, the limiting values can be previously calibrated by measurements on the long-range optical device 10. Measurements can also be carried out here, while experimental personnel use the long-range optical device 10 in a typical manner. In particular, the limiting values 128', 129' can be in a range from 0.6 to 0.8, i.e. in particular can be approximately 0.6, 0.65, 0.7, 0.75, or 0.8.

The norm signal 164 is thus introduced into the block 166 and delayed by a cycle or a time step in a block 198. It is then queried in the comparison operations 201 and 202 whether the norm signal at the present point in time is less than the limiting value and whether it was greater than or equal to the limiting value in the preceding time step or the preceding time cycle. The exceeding of the limiting value 128' is thus precisely determined. The minimum signal 160 is also delayed in a block 200 by a cycle or a time step and corresponding comparison operations with respect to the second limiting value 129' occur in the blocks 203 and 204.

The Boolean output signals of the blocks 201, 202, 203, 204 are input into corresponding logical operators 206, 207, which then deliver a true signal if, in the case of the block 206, the values of the blocks 201, 202 are true and, in the case of the block 207, the values of the blocks 203, 204 are true. The output signal of the block 207 is accordingly reversed in the block 208.

An OR query occurs in the block 209, i.e. this block outputs a true signal if one of its two input signals is true. Furthermore, an interconnection occurs by means of a further logical AND block 210 and a time delay 212 by a step or a time cycle. The illustrated interconnection causes, for example, the block 206 to output a true signal in the event the signal falls below the first limiting value 128'. The block 209 accordingly also switches a true signal. In this state, it is not possible to simultaneously exceed the second limiting value 192, so that a true signal is also applied in the output of the block 208. The block 210 accordingly also switches a true signal, which is buffered in the block 212 in a time step. In this state, the reset signal 142 is therefore also true and has the value 1. I.e., it is switched to a first mode, to which is assigned a movement situation of an intended movement or a pivot procedure.

If the signal now still falls below the first limiting value 128' in the next time step, the block 206 delivers an untrue signal. However, since the true signal is stored for a time step in the block 212, a true signal is still applied to the block 209, so that the block 209 still outputs a true signal. The reset signal 142 is therefore still true, which corresponds to the first mode, which is actually still applied. The true state of the signal 142 is therefore maintained until the minimum signal 160 exceeds the second limiting value 129'. Since the minimum signal 160' is not subjected to the norm formation of the block 162, an end of a pivot or a movement situation assigned to the first mode can therefore be detected very rapidly.

The block 207 outputs a true signal at an end of the pivot, which is inverted to form an untrue signal in the block 208. Therefore, the block 210 also outputs an untrue signal, which is buffered in the block 212. In the following time cycle, the output signal of the block 212 is then untrue, precisely like the output signal of the block 206. The block 209 therefore also switches an untrue signal. The reset signal 142 therefore outputs an untrue signal. A second mode is now switched, to which a movement situation is assigned which corresponds to an unintended movement or a shaky rotational movement.

The block 207 subsequently again switches an untrue signal and the block 208 switches a true signal. However, since the block 209 switches an untrue signal, the block 210 also delivers an untrue signal, which is again buffered for a time step in the block 212. An untrue signal or a zero is therefore applied for the reset signal 142 until the value again falls below a first limiting value 128'.

In this manner, a very robust logic switch for establishing the reset signal 142 can be provided, which determines the mode of the actuation or control of the image stabilization unit 36, 36'. In particular, it is possible to fix various limiting values 128', 129' for switching back and forth between the two modes. The direct use of the minimum signal 160 also allows a possible rapid recognition of an end of an intended movement or a pivot procedure.

What is claimed is:

1. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the respective location derivative value is a location derivative of the trajectory at a discrete point in time, or that the respective location derivative value is an integral of a location derivative of the trajectory over a third period of time and wherein the location derivative is a first derivative of the trajectory with respect to the first movement or with respect to the second movement and/or that the location derivative is a second derivative of the trajectory with respect to the first movement or the second movement and wherein the location derivative is the smaller in absolute value of the first derivatives of the trajectory with respect to the first movement and the second movement and/or that the location derivative is the smaller in absolute value of the second derivatives of the trajectory with respect to the first movement and the second movement.

2. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the first movement is a rotational movement and the second movement is a rotational movement and the trajectory is an angle trajectory.

3. The long-range optical device according to claim 2, wherein the comparative value is an arc length of the location derivative value over a first period of time.

4. The long-range optical device according to claim 2, wherein the comparative value is a norm of the respective location derivative value at a discrete point in time, or that the comparative value is an integral of a norm of the respective location derivative value over a second period of time.

5. The long-range optical device according to claim 4, wherein the norm is the absolute value, or that the norm is a p-norm or that the norm is the Euclidean norm.

6. The long-range optical device according to claim 2, wherein the respective location derivative value is a location derivative of the trajectory at a discrete point in time, or that the respective location derivative value is an integral of a location derivative of the trajectory over a third period of time.

7. The long-range optical device according to claim 6, wherein the location derivative is a first derivative of the trajectory with respect to the first movement or with respect to the second movement and/or that the location derivative is a second derivative of the trajectory with respect to the first movement or the second movement.

8. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the mode detection unit is designed such that it ascertains more than one comparative value and results of a respective comparison of each comparative value with a respective limiting value are linked by a logic gate.

9. The long-range optical device according to claim 8, wherein the mode detection unit is designed such that a first comparative value of the plurality of comparative values corresponds to a second comparative value of the plurality of comparative values at an earlier point in time.

10. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the long-range optical device is further designed such that a movement situation is assigned to a first mode which corresponds to a pivot procedure, and an angle signal for actuating the at least one image stabilization unit is set to zero in the first mode.

11. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the long-range optical device is further designed such that a movement situation is assigned to a first mode which corresponds to a pivot procedure, and an angle signal for actuating the at least one image stabilization unit is generated by an integrator unit and an amplitude offset of the angle signal which is induced by the pivot procedure is eliminated, in that the integrator unit is reset to zero upon leaving the first mode.

12. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the long-range optical device is further designed such that a position signal for actuating the at least one image stabilization unit is generated by an integrator unit of the signal processing unit and an elimination of an amplitude offset of the position signal which is induced by a movement procedure is performed in that the signal processing unit subtracts a mean value of the position signal which mean value is ascertained over a fourth period of time, from the position signal.

13. A long-range optical device having at least one tube, in which an optical system is positioned, having at least one image stabilization unit, which is designed for the purpose of moving at least one optical assembly of the optical system relative to the at least one tube, having at least one signal processing unit which is designed such that it actuates the at least one image stabilization unit in one mode of a plurality of modes, wherein a respective movement situation of the long-range optical device is assigned to each mode, and having a mode detection unit which is designed such that it determines the mode from the plurality of modes, wherein the mode detection unit is furthermore designed such that it determines the mode in that it ascertains at least one comparative value from a respective location derivative value of a trajectory formed from a first movement and a second movement of the long-range optical device and compares the at least one comparative value to a respective limiting value and wherein the long-range optical device is further designed such that a position signal for actuating the at least one image stabilization unit is generated by an integrator unit of the signal processing unit and an elimination of an amplitude offset of the position signal induced by a movement procedure and a limiting of the position signal to a maximum amplitude are performed, in that the signal processing unit ascertains a subtraction value in that it divides the position signal by double the maximum amplitude and then rounds it to a closest whole number and then multiplies the closest whole number by double the maximum amplitude and then subtracts the subtraction value from the position signal.

14. The long-range optical device according to claim 13, wherein the signal processing unit divides the position signal by a scaling factor before the elimination of the amplitude offset and the limiting to the maximum amplitude and multiplies it by the scaling factor after the elimination of the amplitude offset and the limiting to the maximum amplitude.

15. The long-range optical device according to claim 13, wherein the long-range optical device is further designed such that a position signal for actuating the at least one image stabilization unit is generated by an integrator unit of the signal processing unit and an elimination of an amplitude offset of the position signal which is induced by a movement procedure is performed in that the signal processing unit subtracts a mean value of the position signal which mean value is ascertained over a fourth period of time, from the position signal.

* * * * *